(12) United States Patent
Ancel

(10) Patent No.: US 7,333,016 B2
(45) Date of Patent: Feb. 19, 2008

(54) PROPERTY ENTRANCE AND EXIT NOTIFICATION, INVENTORY CONTROL SYSTEM

(76) Inventor: Thomas A. Ancel, 13531 Sunset Ridge La., St. Louis, MO (US) 63128

( * ) Notice: Subject to any disclaimer, the term of this patent is extended or adjusted under 35 U.S.C. 154(b) by 25 days.

(21) Appl. No.: 11/211,878

(22) Filed: Aug. 26, 2005

(65) Prior Publication Data

US 2006/0044132 A1   Mar. 2, 2006

Related U.S. Application Data

(63) Continuation of application No. 10/918,799, filed on Aug. 16, 2004, which is a continuation-in-part of application No. 10/023,030, filed on Feb. 19, 2002, now Pat. No. 6,812,849.

(60) Provisional application No. 60/254,947, filed on Dec. 12, 2000.

(51) Int. Cl.
*G08B 13/14* (2006.01)
(52) U.S. Cl. ............................... 340/572.1; 340/573.1; 235/385; 700/225
(58) Field of Classification Search ............ 340/573.1, 340/573.4, 572.1, 572.9; 235/375, 385; 700/215, 700/225
See application file for complete search history.

(56) References Cited

U.S. PATENT DOCUMENTS

| 4,682,155 | A | * | 7/1987 | Shirley ................ 340/573.4 |
| 5,047,748 | A | * | 9/1991 | Trickle ................ 340/542 |
| 5,168,267 | A | | 12/1992 | Trickle |
| 5,453,735 | A | | 9/1995 | Hahn |
| 5,565,858 | A | * | 10/1996 | Guthrie ................ 340/10.33 |
| 5,646,592 | A | * | 7/1997 | Tuttle ................ 340/545.6 |
| 5,661,457 | A | | 8/1997 | Ghaffari et al. |
| 5,712,789 | A | | 1/1998 | Radican |
| 5,886,634 | A | * | 3/1999 | Muhme ................ 340/572.1 |
| 6,329,931 | B1 | | 12/2001 | Gutton |
| 6,422,466 | B1 | | 7/2002 | Dickson et al. |
| 6,600,418 | B2 | | 7/2003 | Francis et al. |
| 2002/0038267 | A1 | | 3/2002 | Can et al. |
| 2003/0034390 | A1 | | 2/2003 | Linton et al. |

OTHER PUBLICATIONS

St. Louis Post Dispatch Tuesday Nov. 22, 2005 120 Arrested On Immigration Violations at Wall-Mart Site Articales attached.

* cited by examiner

*Primary Examiner*—Benjamin C. Lee
(74) *Attorney, Agent, or Firm*—Douglas E. Warren

(57) ABSTRACT

A property entrance and exit notification, inventory control system of the present invention automates the documentation of entry time, exit time and position of personnel entering, equipment, tools and vehicles exiting and movement throughout the property. Being logged into the system identifies time of entry onto the property and time of exit off the property. Logging in with an identification card into the system is identified and activated by one of the following; "RFID" Radio Frequency Identification, "SAW" Surface Acoustic Wave, Barcode or "GPS" Global Positioning System. Furthermore at time of entry login, GPS Responders are activated to monitor location of personnel on the property. At time of exit off the property the GPS Responders are deactivated.

2 Claims, 30 Drawing Sheets

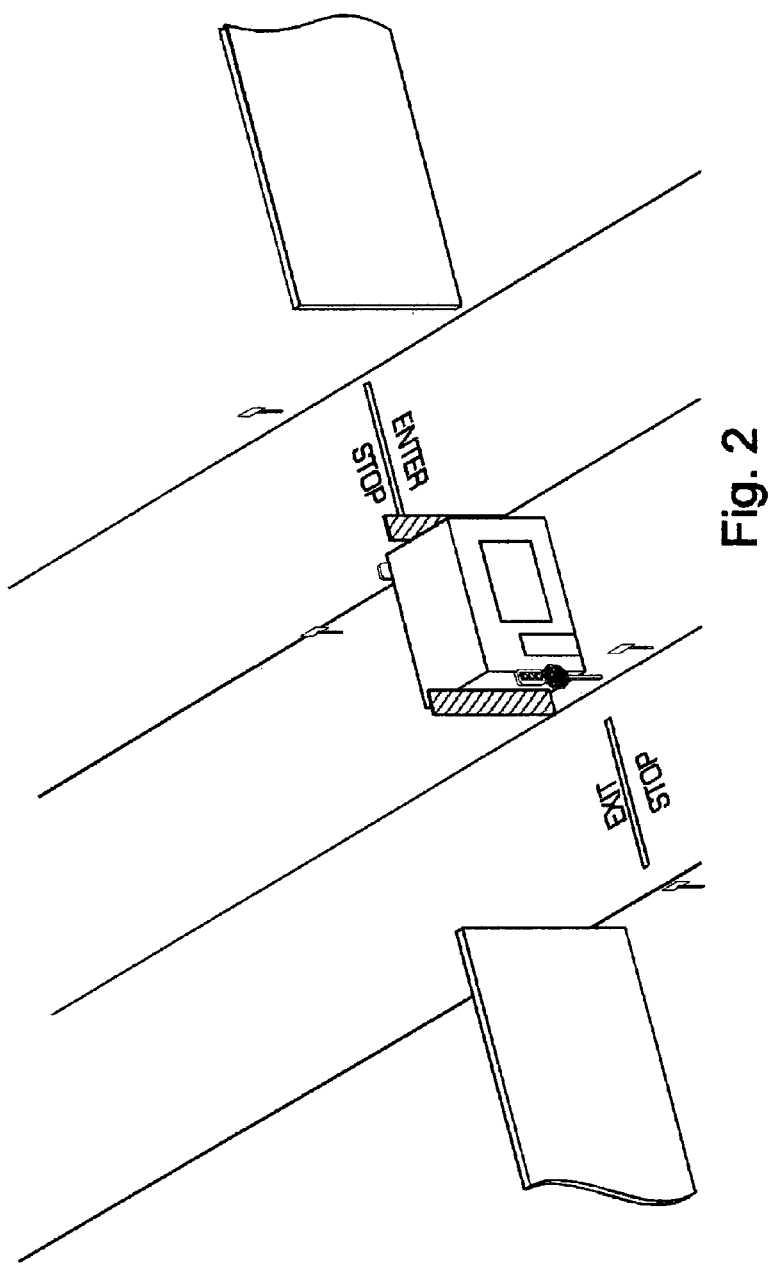

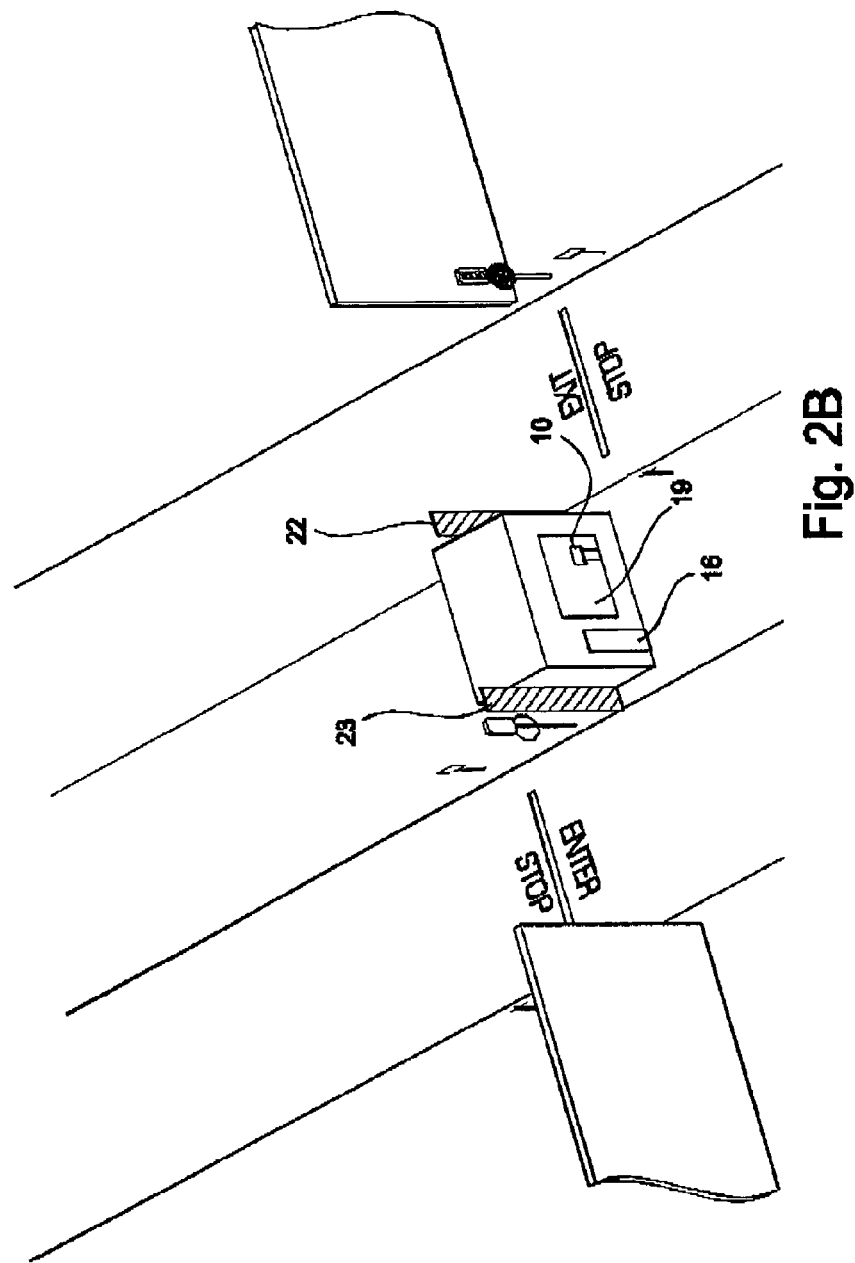

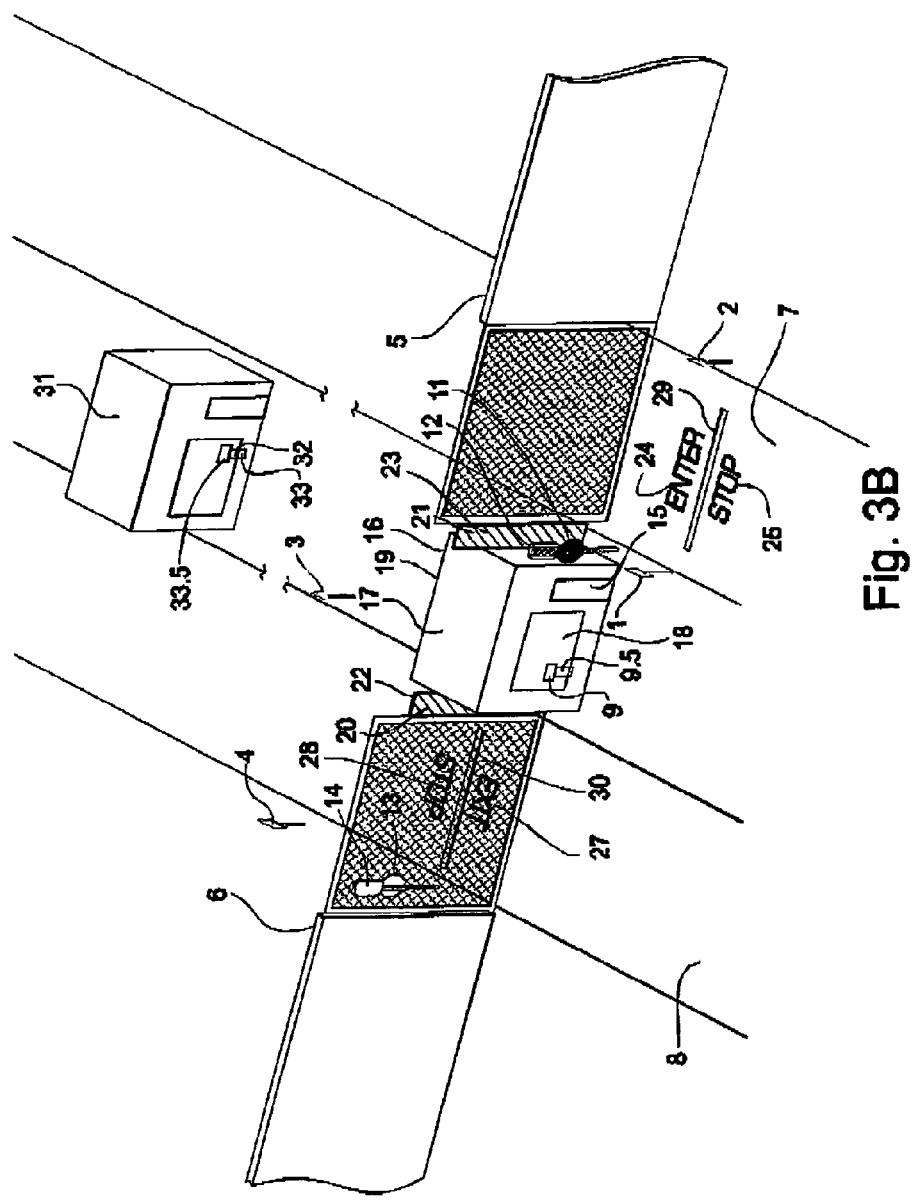

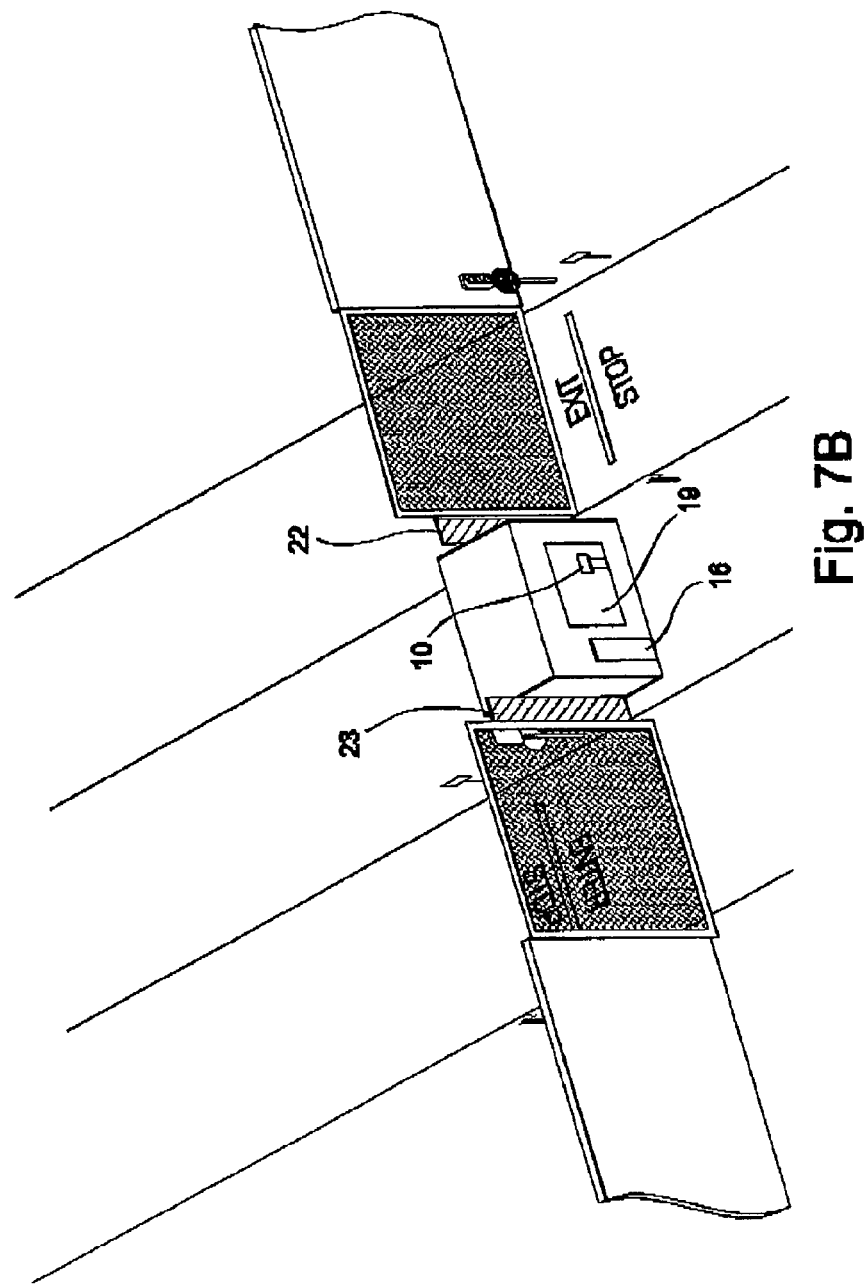

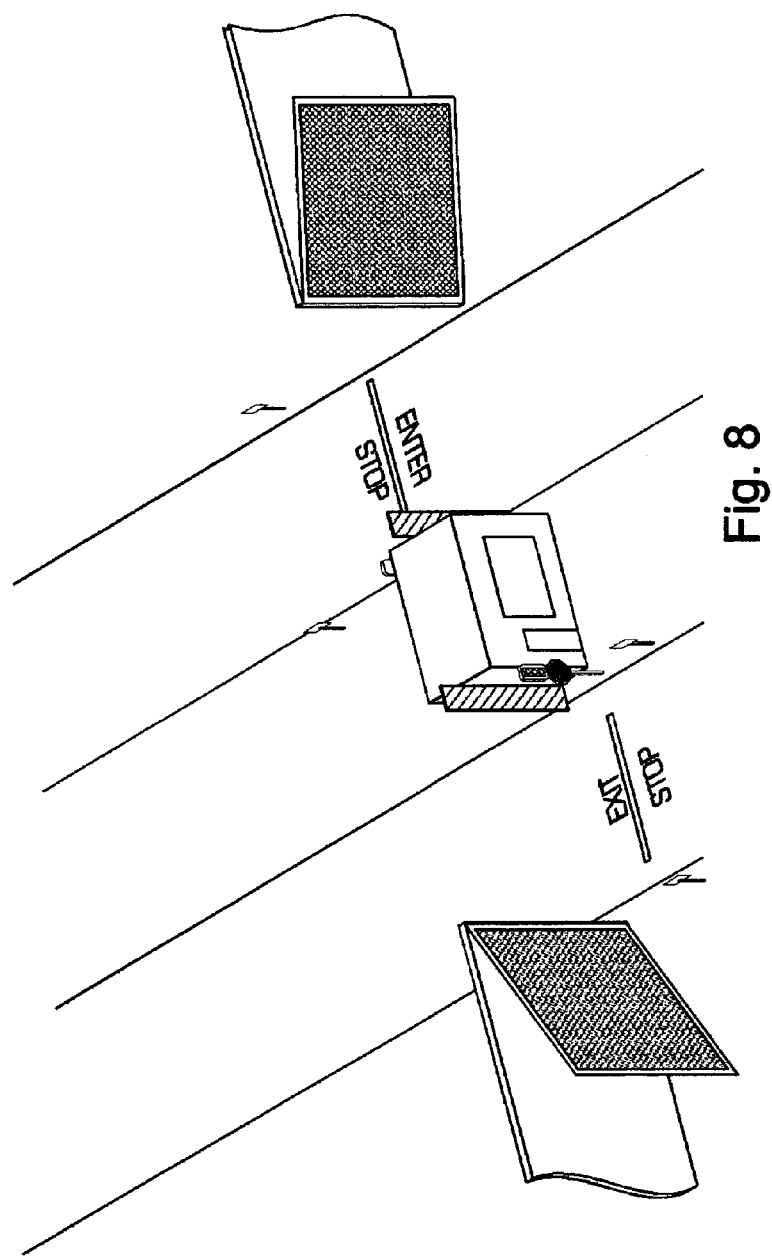

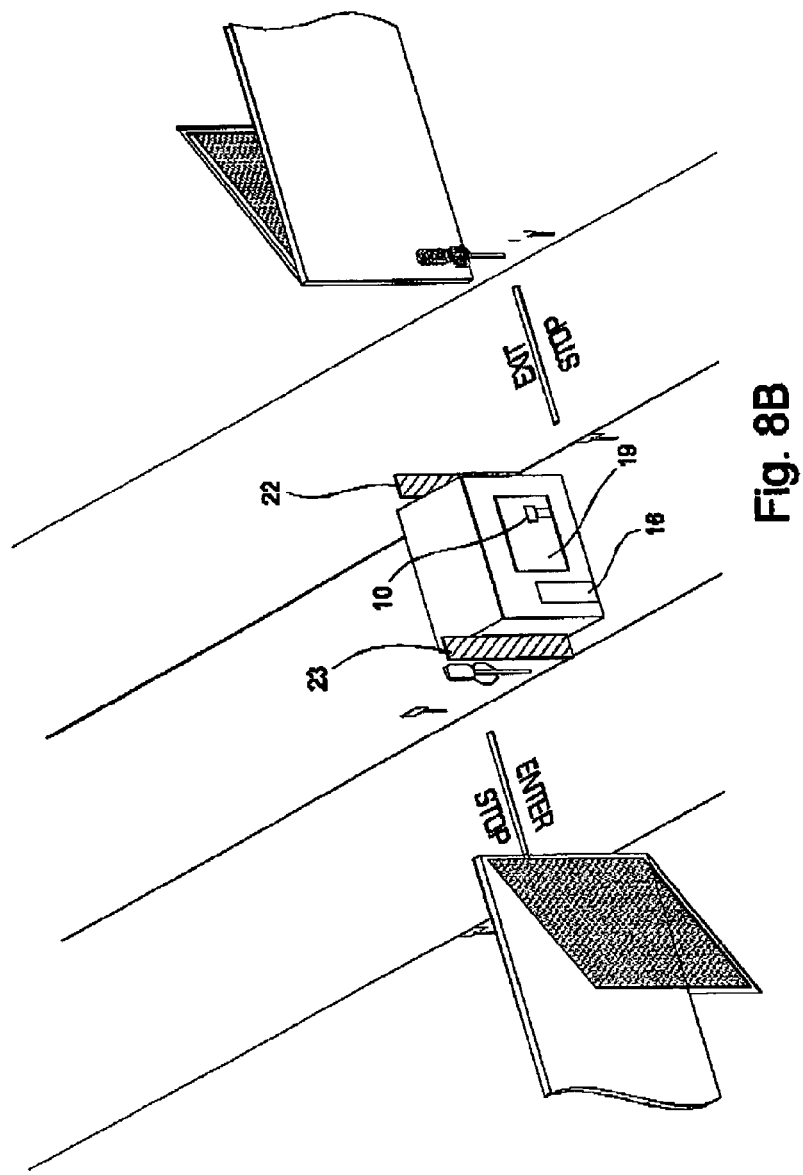

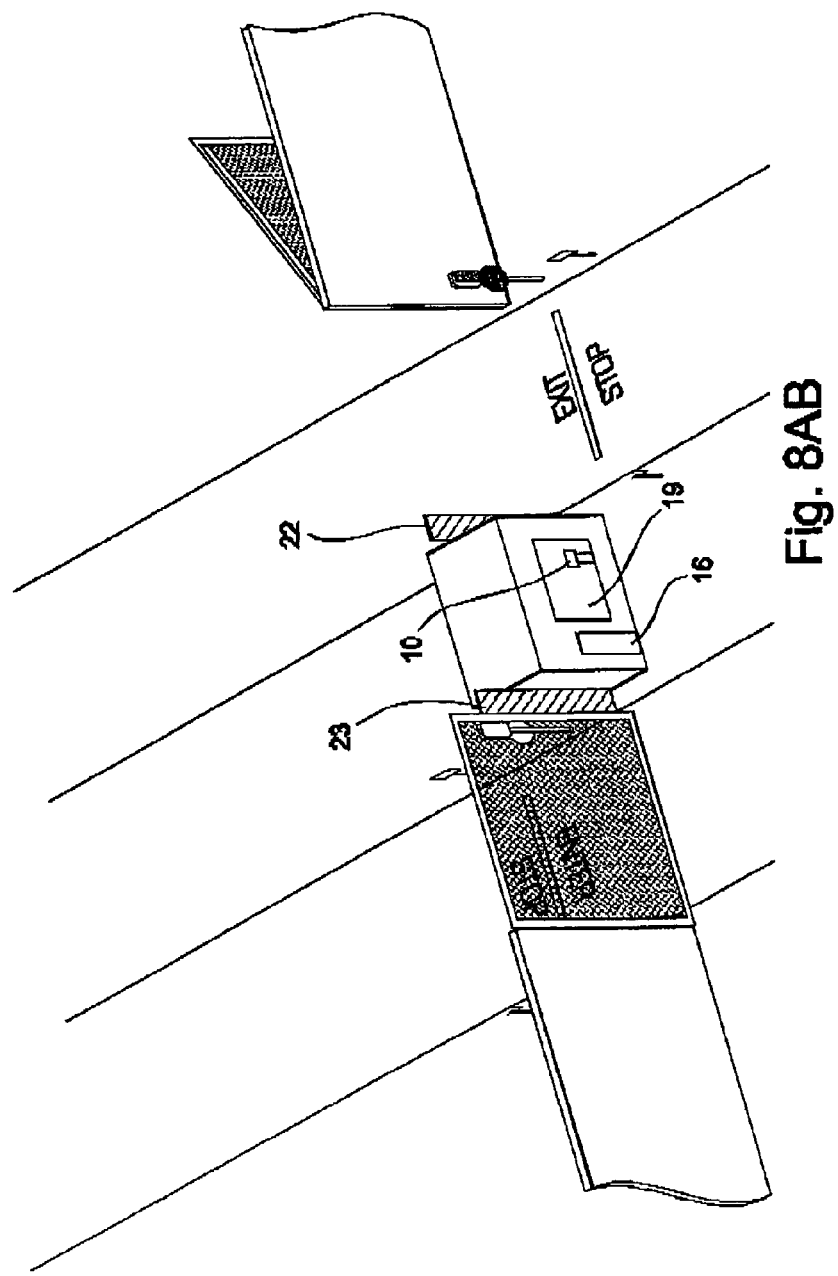

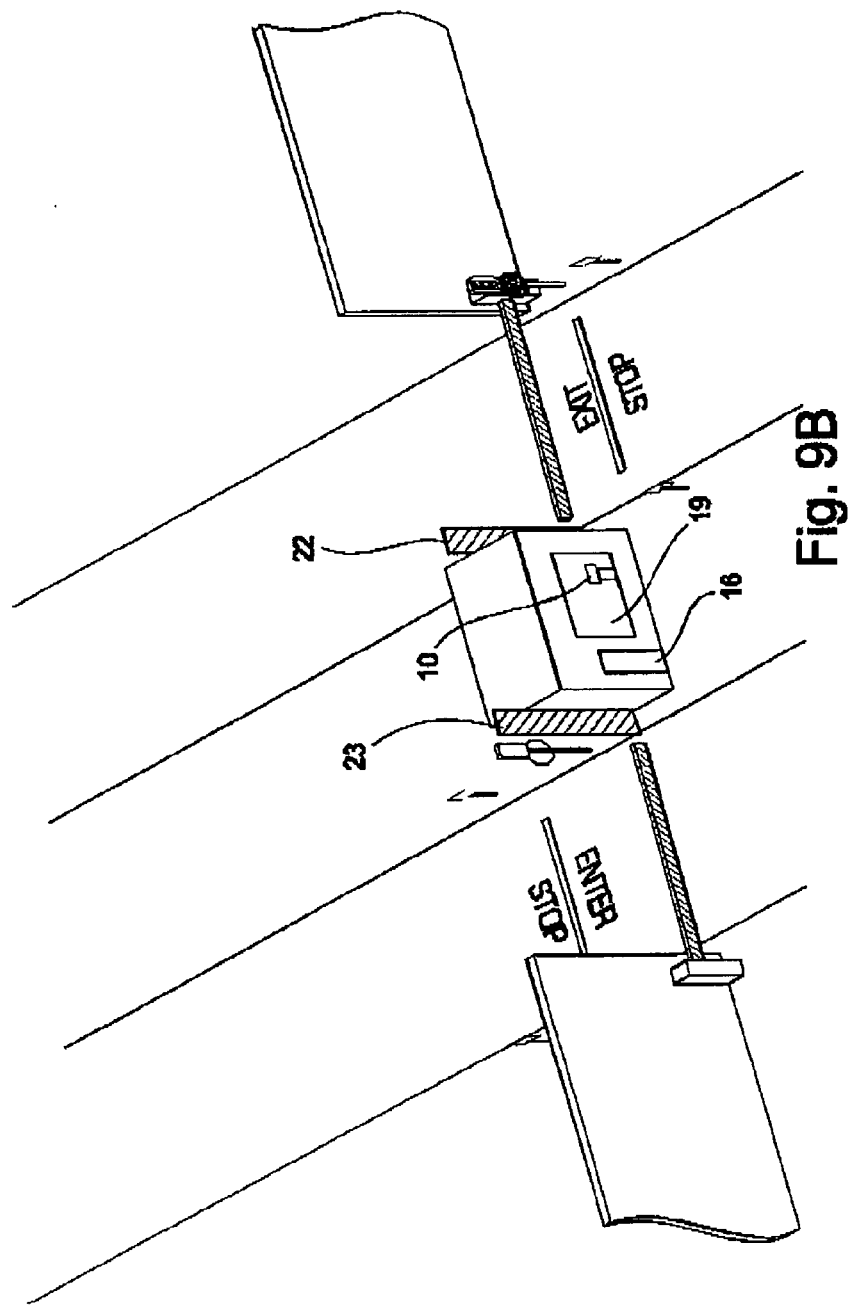

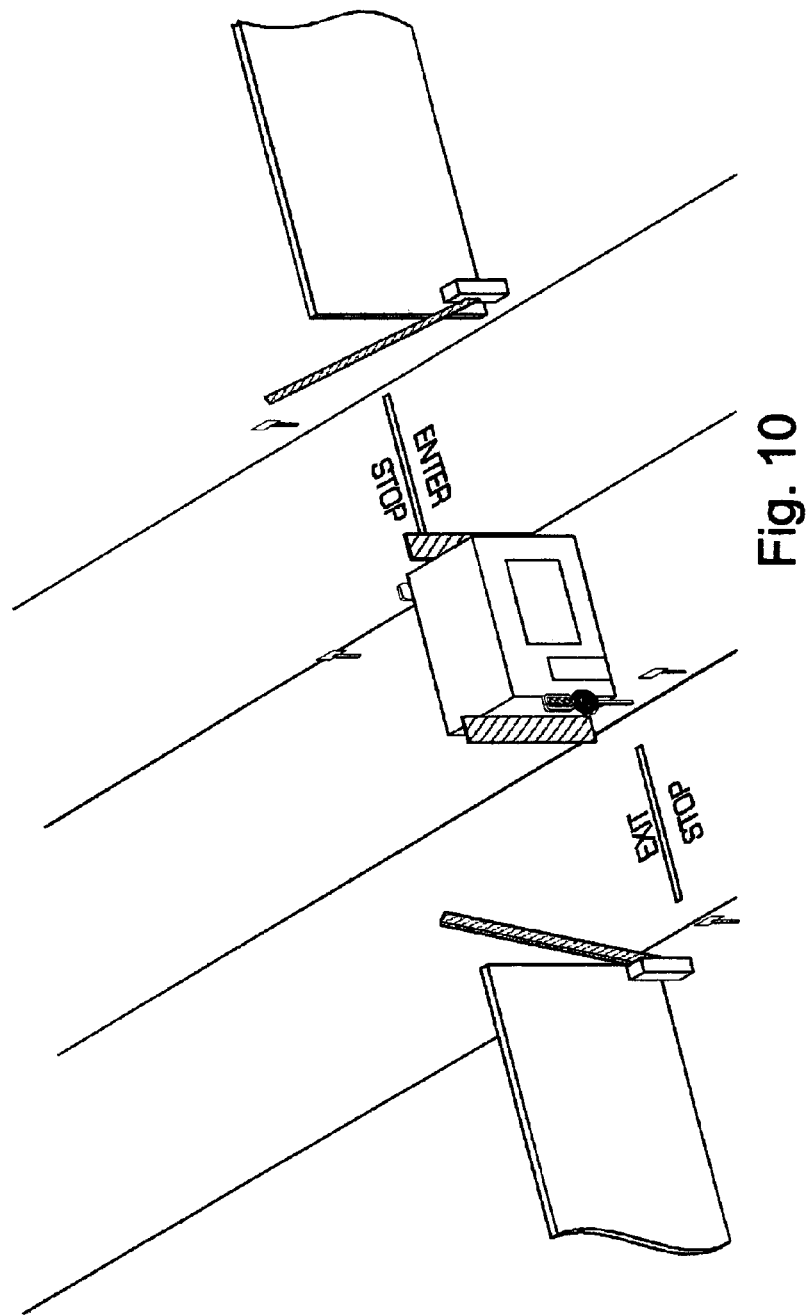

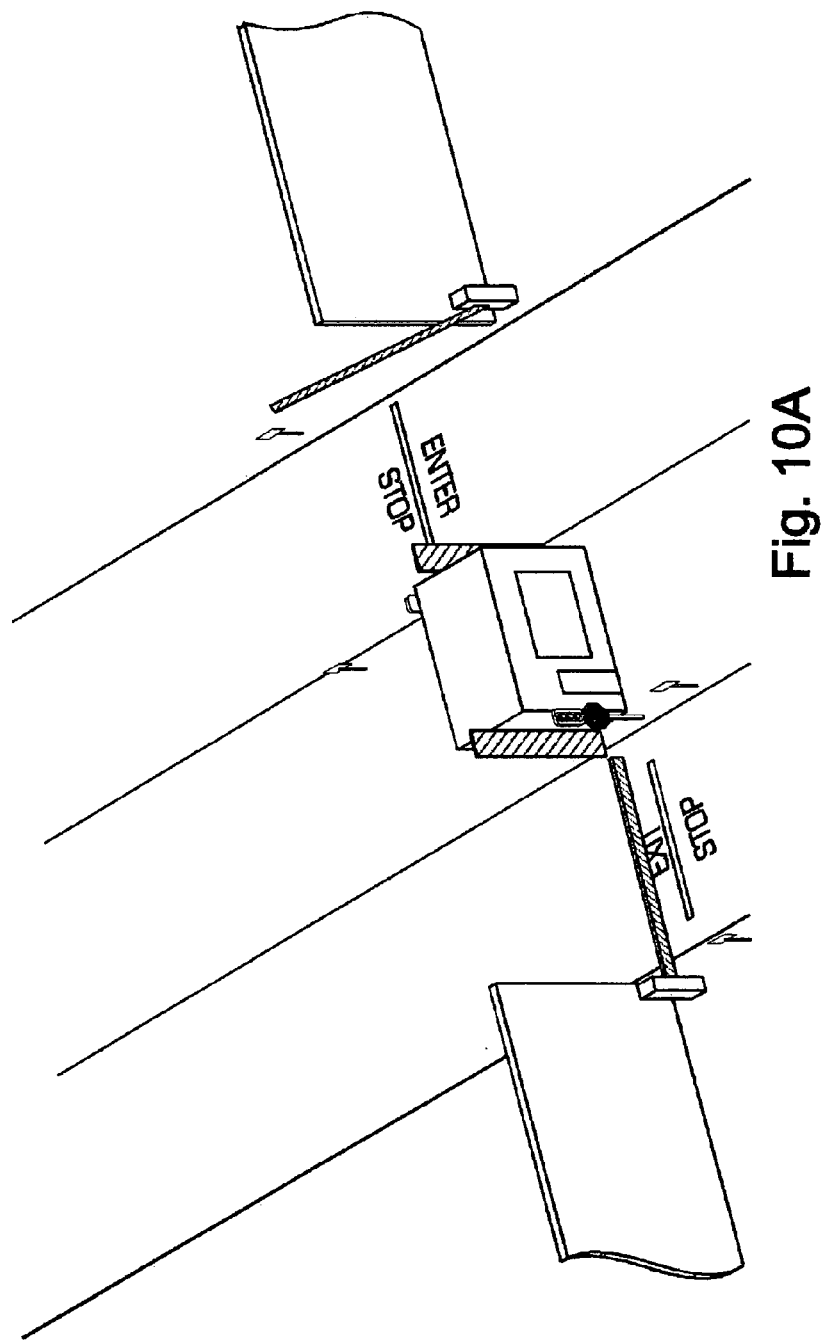

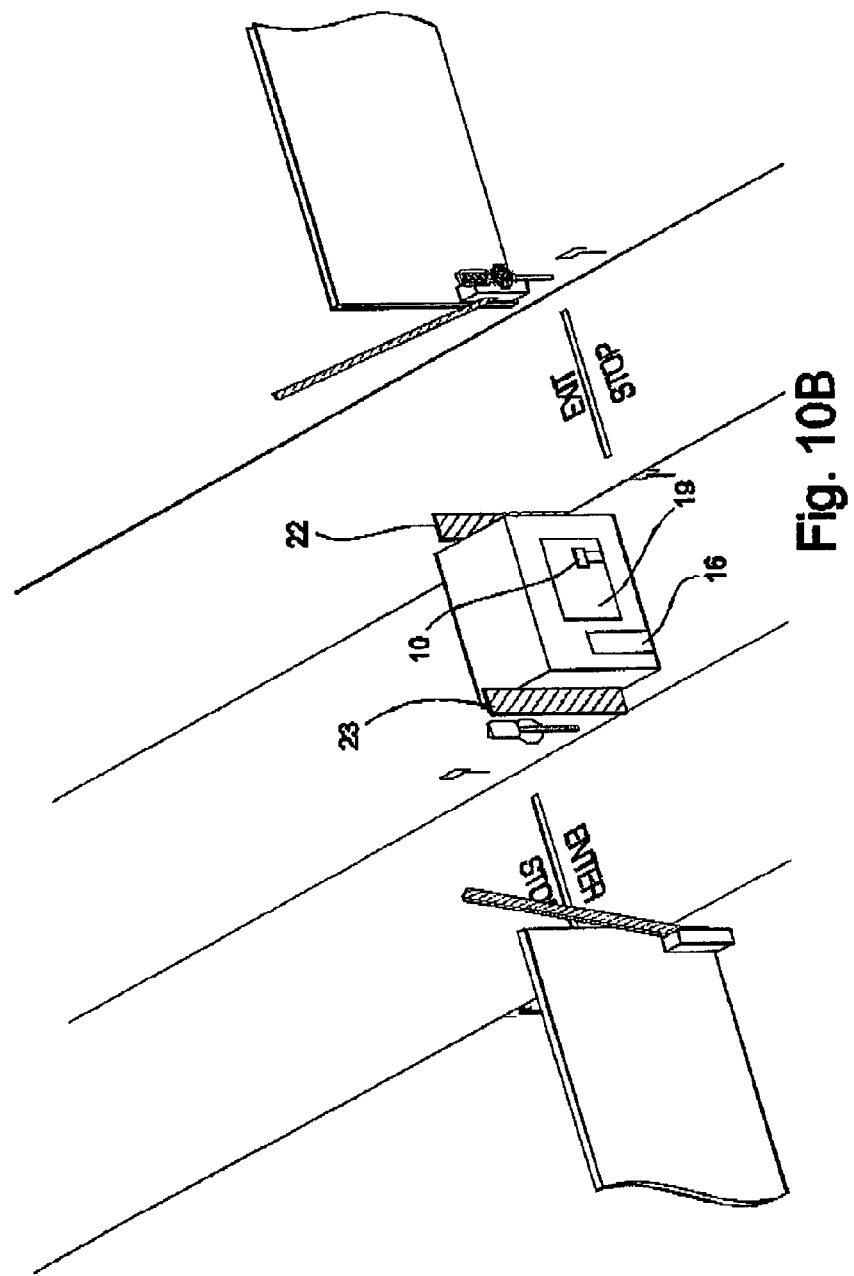

PROPERTY ENTRANCE AND EXIT NOTIFICATION, INVENTORY CONTROL SYSTEM

BACKGROUND OF THE INVENTION

The application is a continuation of application Ser. No. 10/918,799, filed Aug. 16, 2004, a continuation-in-part of Ser. No. 10/023,030, filed Feb. 19, 2002, U.S. Pat. No. 6,812,849 B1 issued Nov. 02, 2004, based on provisional application Ser. No. 60/254,947 filed Dec. 12, 2000.

OBJECTS OF THE INVENTION

One object of the present invention is to provide a means to automate date and time documentation of personnel entrance onto property and exit off property.

Another object of the present invention is to provide a means to automate location documentation of personnel entrance onto property and exit off property.

Another object of the present invention is to provide a means to automate location documentation of personnel on the property.

Another object of the present invention is to provide a means to automate date and time documentation of equipment, shipping and storage containers and tools entrance onto property and exit off property.

Another object of the present invention is to provide a means to automate location documentation of equipment, shipping and storage containers and tools on the property.

Another object of the present invention is to provide a means to automate date and time documentation of vehicle entrance onto property and exit off property.

Another object of the present invention is to provide a means to automate location documentation of vehicles on the property.

Other objects of the present invention will become apparent from the following description and drawings.

SUMMARY

The present invention comprises a driveway entrance, gate area, property, automated scanning system, automated tracking system, documentation software system and documentation hardware system. As the personnel enter up the driveway and proceed through the scanner area in vehicle or on foot the automated scanning system reads the ID Identification Cards held by the personnel. The ID Identification Card can be read while the personnel are in the vehicle or out of the vehicle. The automated scanning system identifies the date and time of entry onto the property and the time of exit off the property. At time of entrance login onto the property via the automated scanning system using and the ID Identification Card, a personnel record is automatically generated in the software database. At the same time of entrance automated login a GPS Global Positioning System tracking method is activated and monitors the personnel tools, vehicles, shipping and storage containers throughout the property and records monitoring data to a database. During the process of GPS monitoring the personnel tools, vehicles, shipping and storage containers throughout the property, a signature map of time and location of the personnel is recorded into a database for real time viewing or viewing at a later time by management. The purpose of automated scanning of personnel, tools, vehicles, equipment, shipping and storage containers entrance and exit onto the property is to identity entrance times and exit times of personnel, tools, vehicles, equipment, shipping and storage containers. The purpose of tracking personnel tools, vehicles, equipment, shipping and storage containers throughout the property is to identify time and location including scheduling, job location, safety related issues, lost personnel, inventory and loss prevention. Scanned data and monitoring data is automatically uploaded to database software and can be viewed anywhere by management on or off the property by a viewing means. Viewing of the scanned data and monitoring data can be viewed by management with or without a pass code.

The property entrance and exit notification, inventory control system of the present system uses one or more of scanning means of (RFID) Radio Frequency Identification, (SAW) surface acoustic wave technology, Barcode or (GPS) Global Positioning System.

The property entrance and exit notification, inventory control system of the present system uses tracking means of (GPS) Global Positioning System.

The present invention is applicable to the following areas and facilities: Federal and State Prisons; Federal and State Warehouse Property; Federal and State Warehouse Property including property for hazardous material; Federal and State Distribution Property Areas; Commercial Warehouses Property; Commercial Distribution Property Areas; Private, State and Federal Construction Sites, and other cites.

THE DRAWINGS

FIG. 2 is an internal frontal view inside the property of the driveway exit and entrance of the property with the scanner on both sides of the driveway located on vertical bollard posts.

Figure 1:
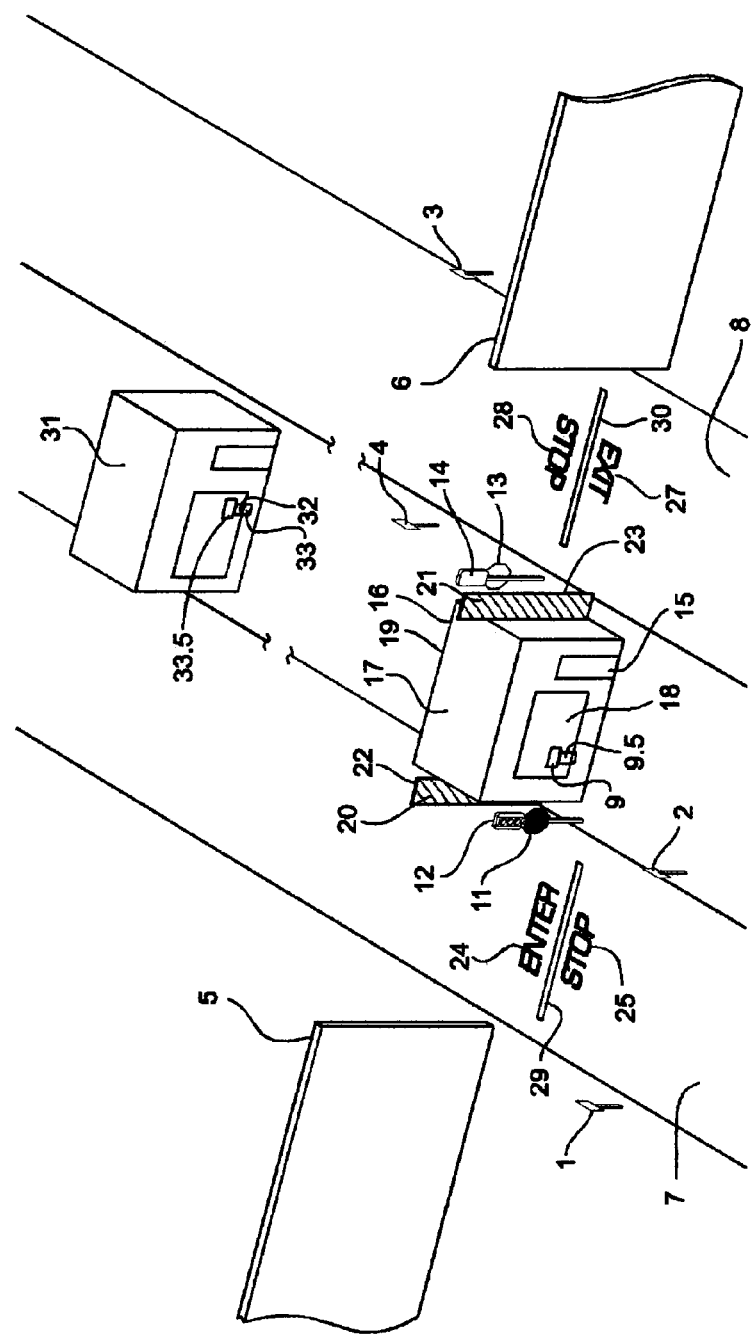
FIG. 1 is an external frontal view outside the property of the driveway entrance and exit of the property with the scanner on both sides of the driveway located on vertical bollard posts of the present invention.
Figure 1B:
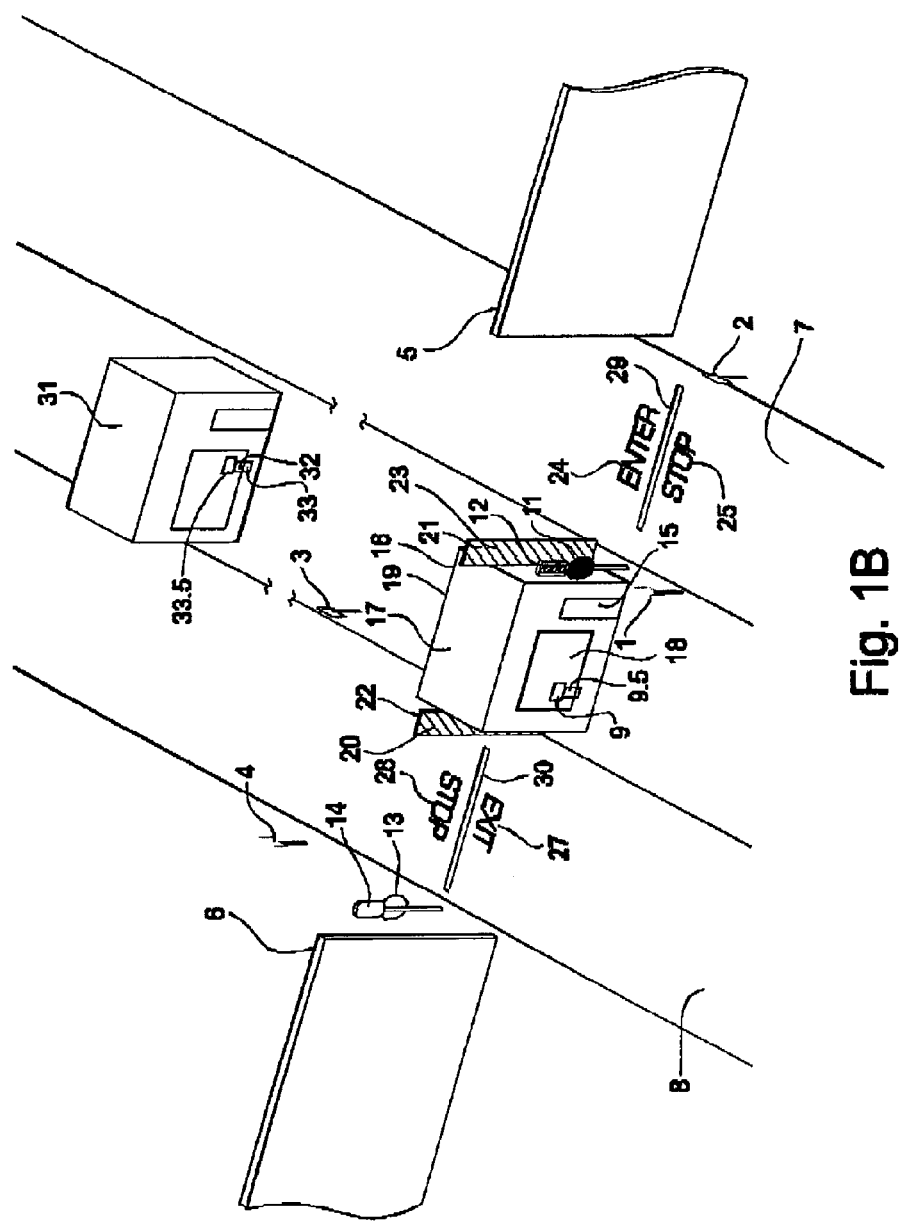
Figure 3:
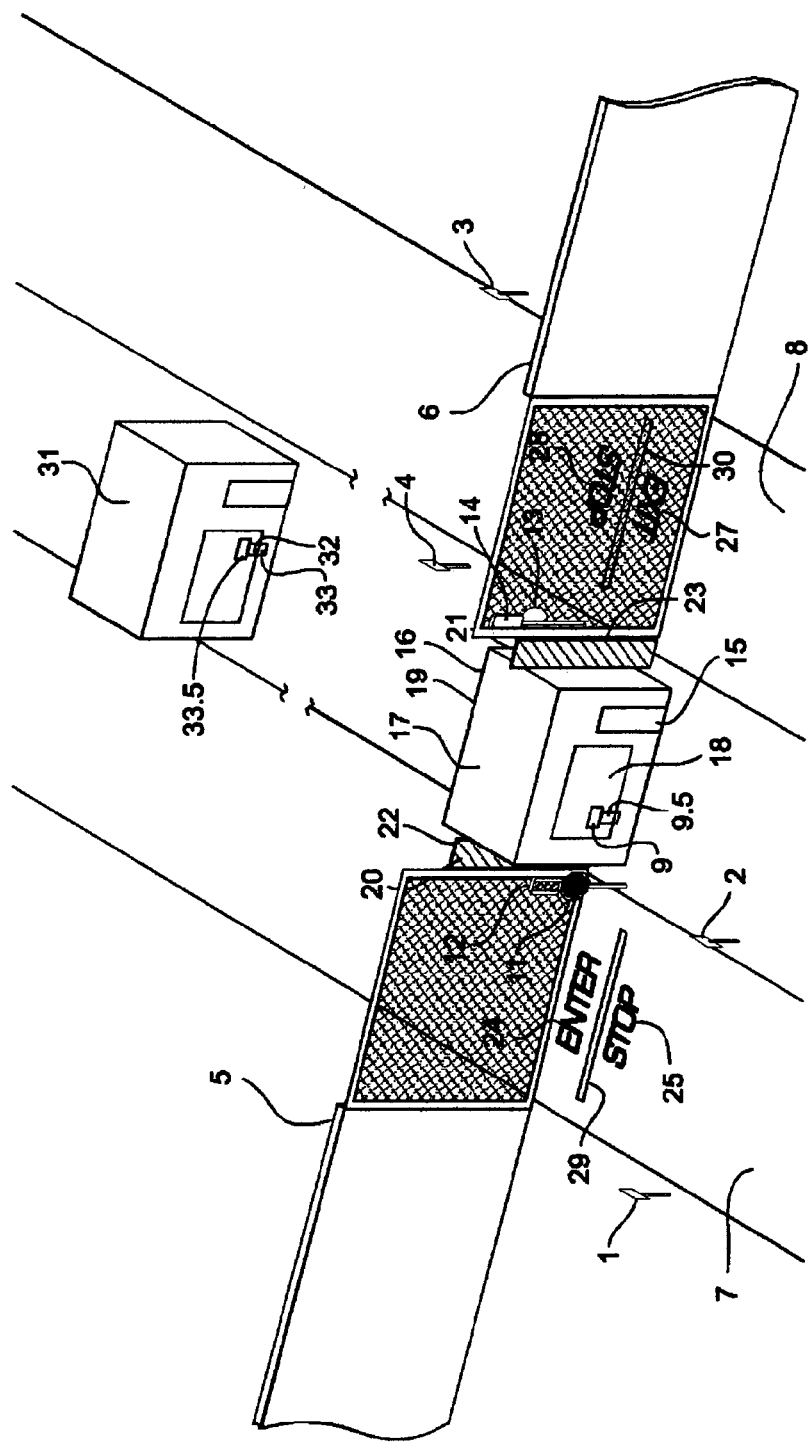
FIG. 3 is an external frontal view outside the property of the driveway entrance and exit of the property with the scanner on both sides of the driveway located on vertical bollard posts while the gates are closed.
Figure 4:
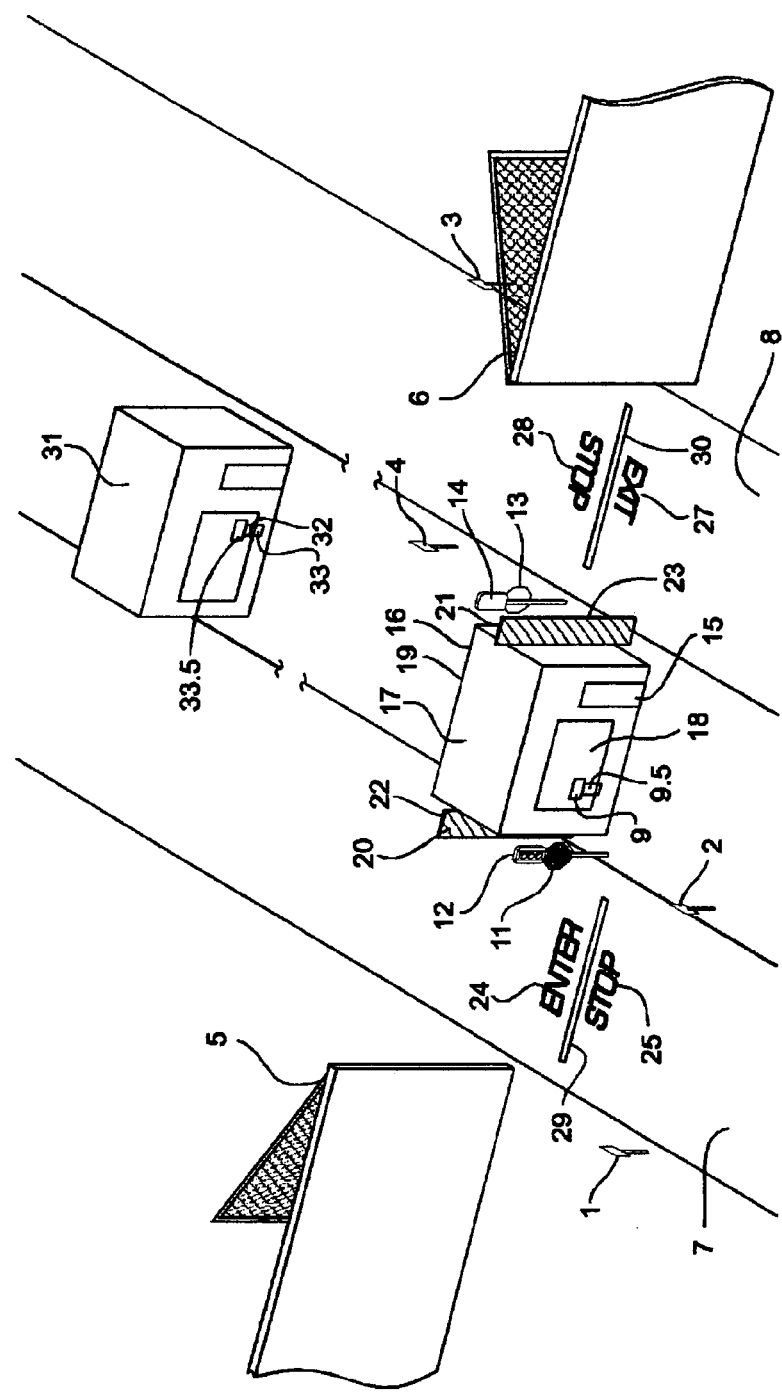
FIG. 4 is an external frontal view outside the property of the driveway entrance and exit of the property with the scanner on both sides of the driveway located on vertical bollard posts while the gates are open.
Figure 4A:
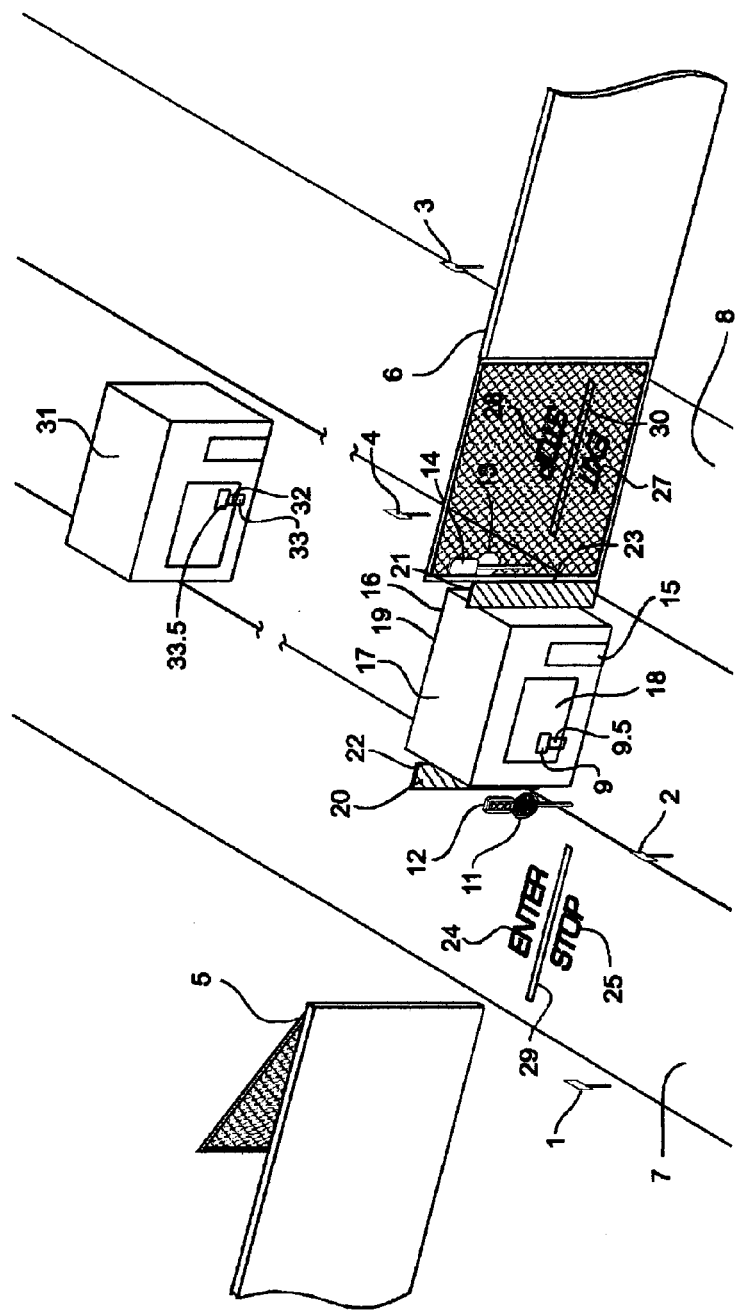
Figure 4B:
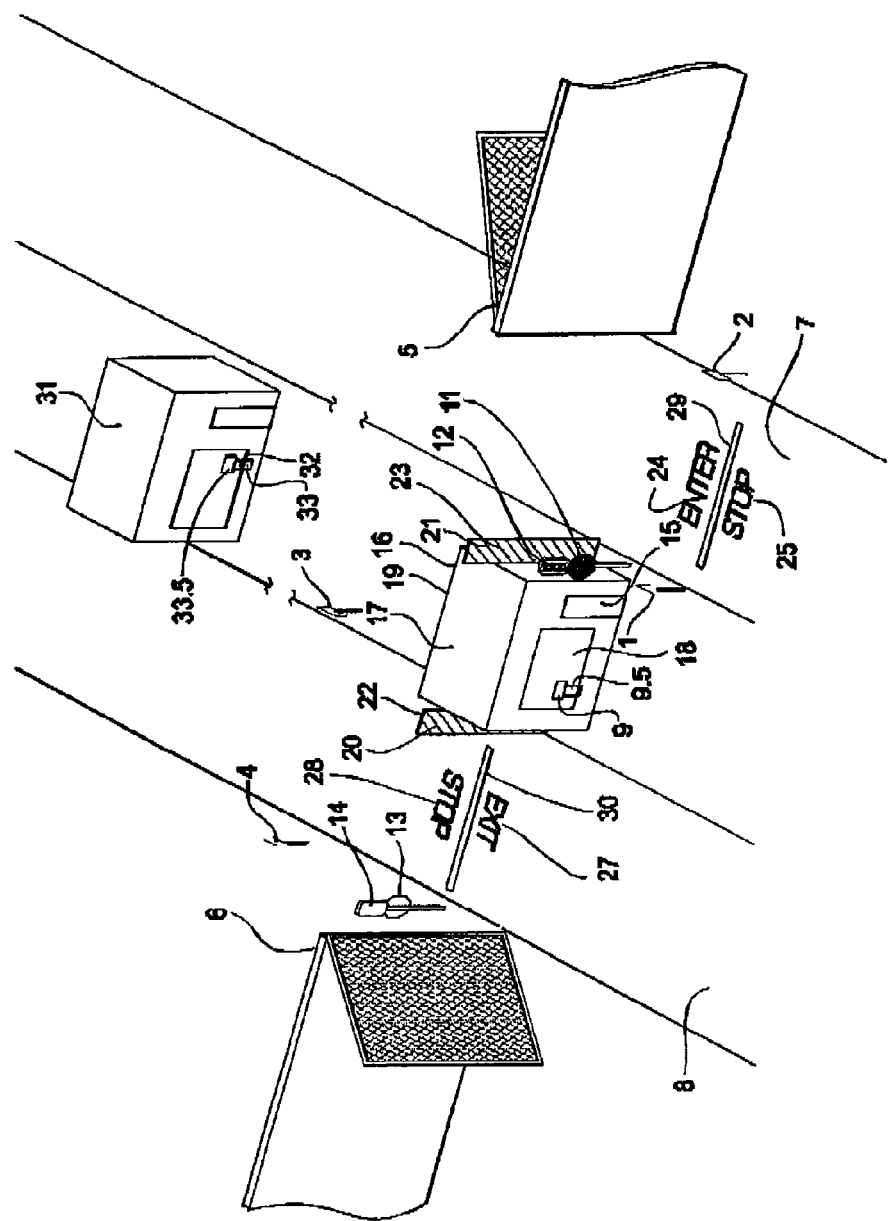
Figure 4A:
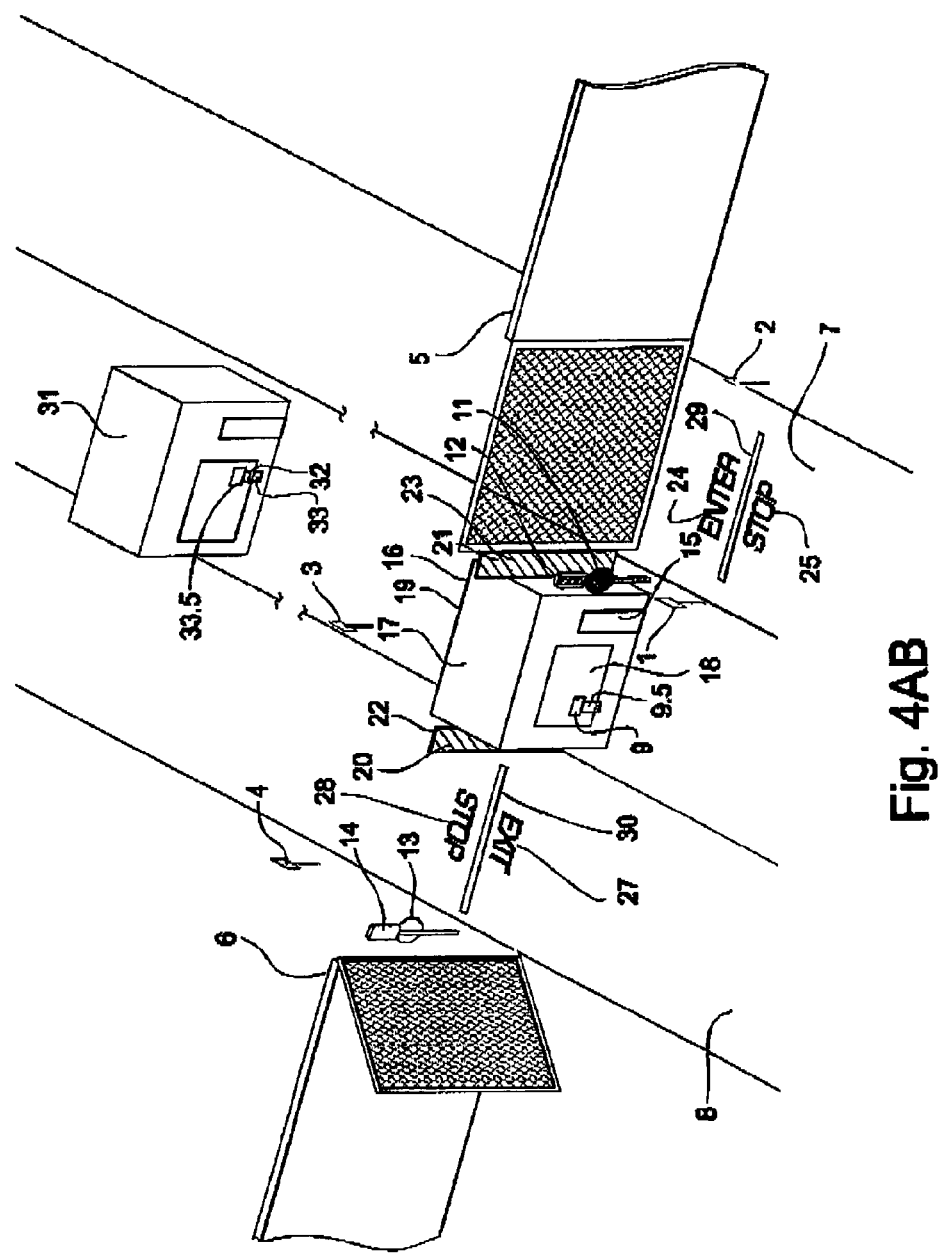

FIG. 4*a* is an external frontal view outside the property of the driveway entrance and exit of the property with the scanner on both sides of the driveway located on vertical bollard posts while one gate is open and one gate is closed.

Figure 5:
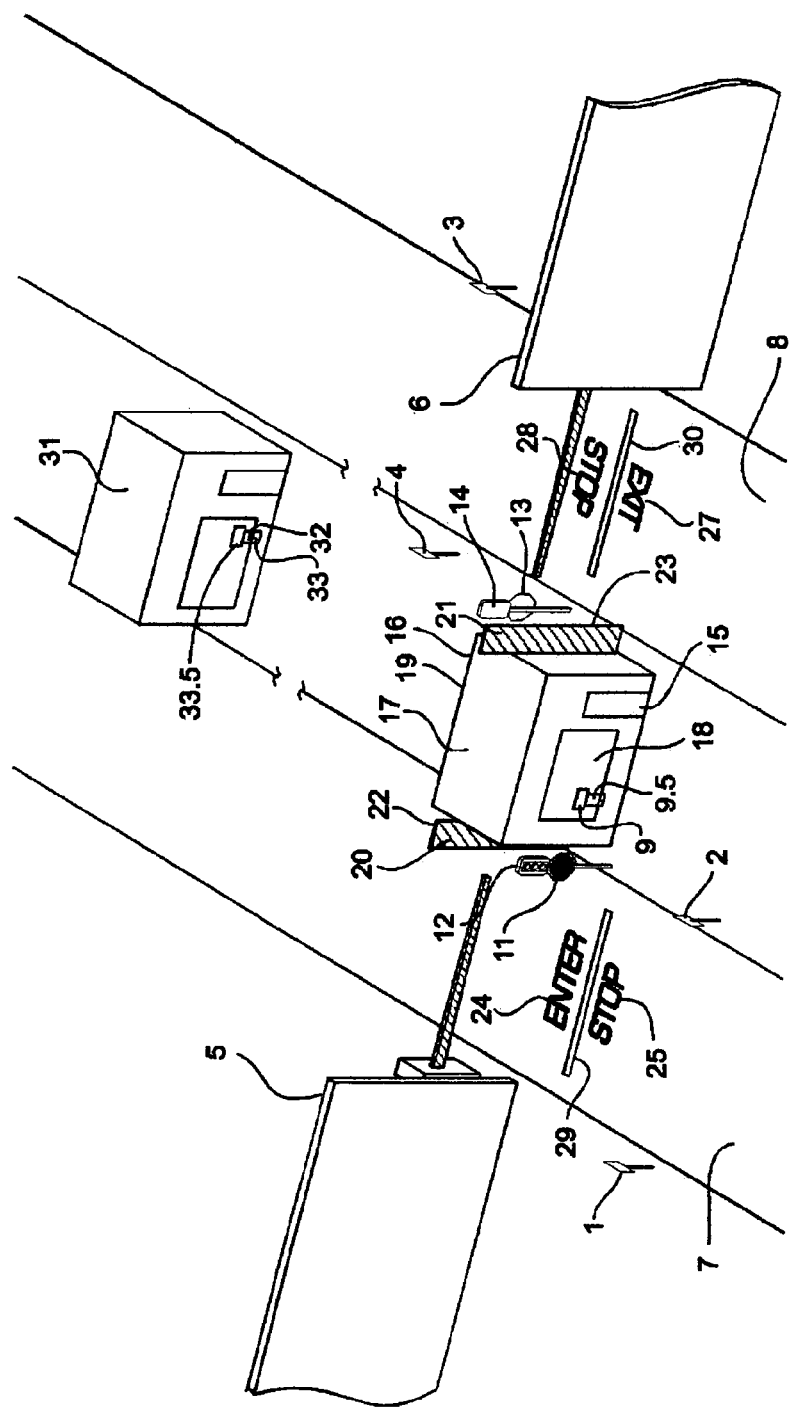
Figure 5B:
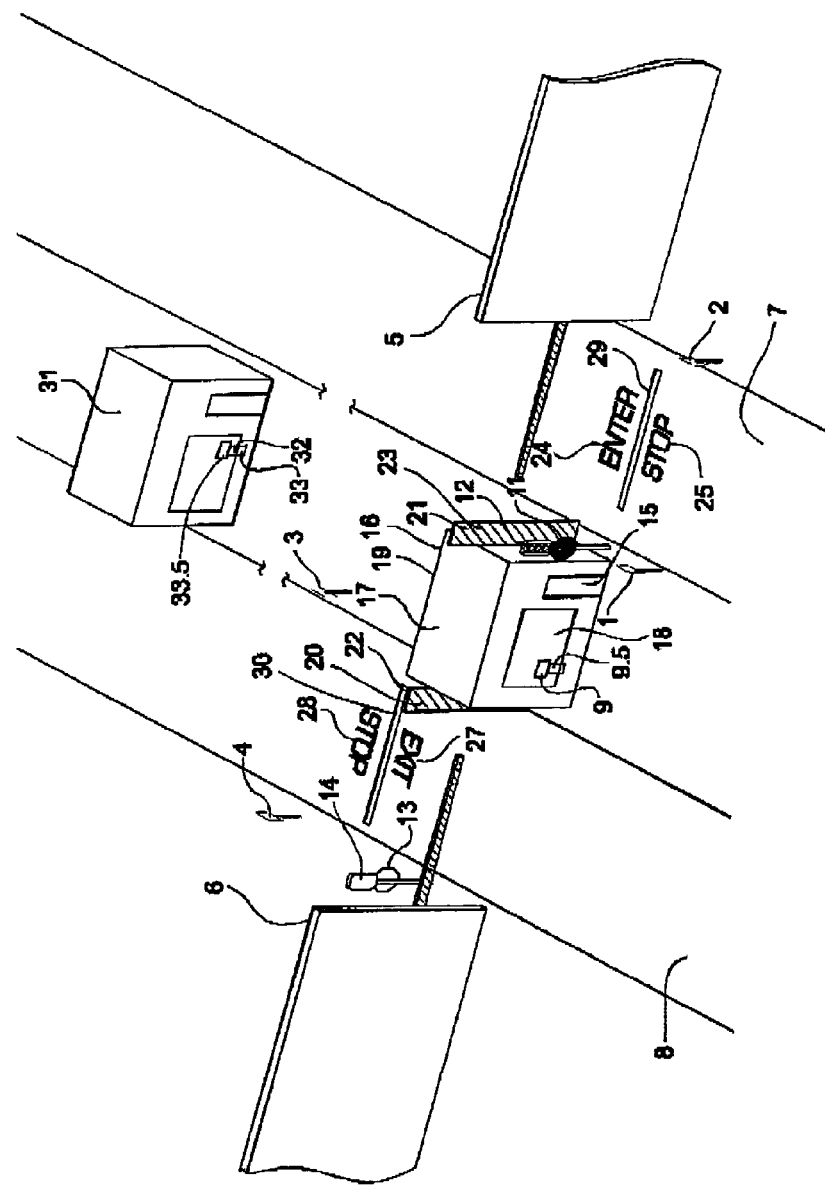

FIG. 5 is an external frontal view outside the property of the driveway entrance and exit of the property with the scanner on both sides of the driveway located on vertical bollard posts while the barricades are closed.

Figure 6:
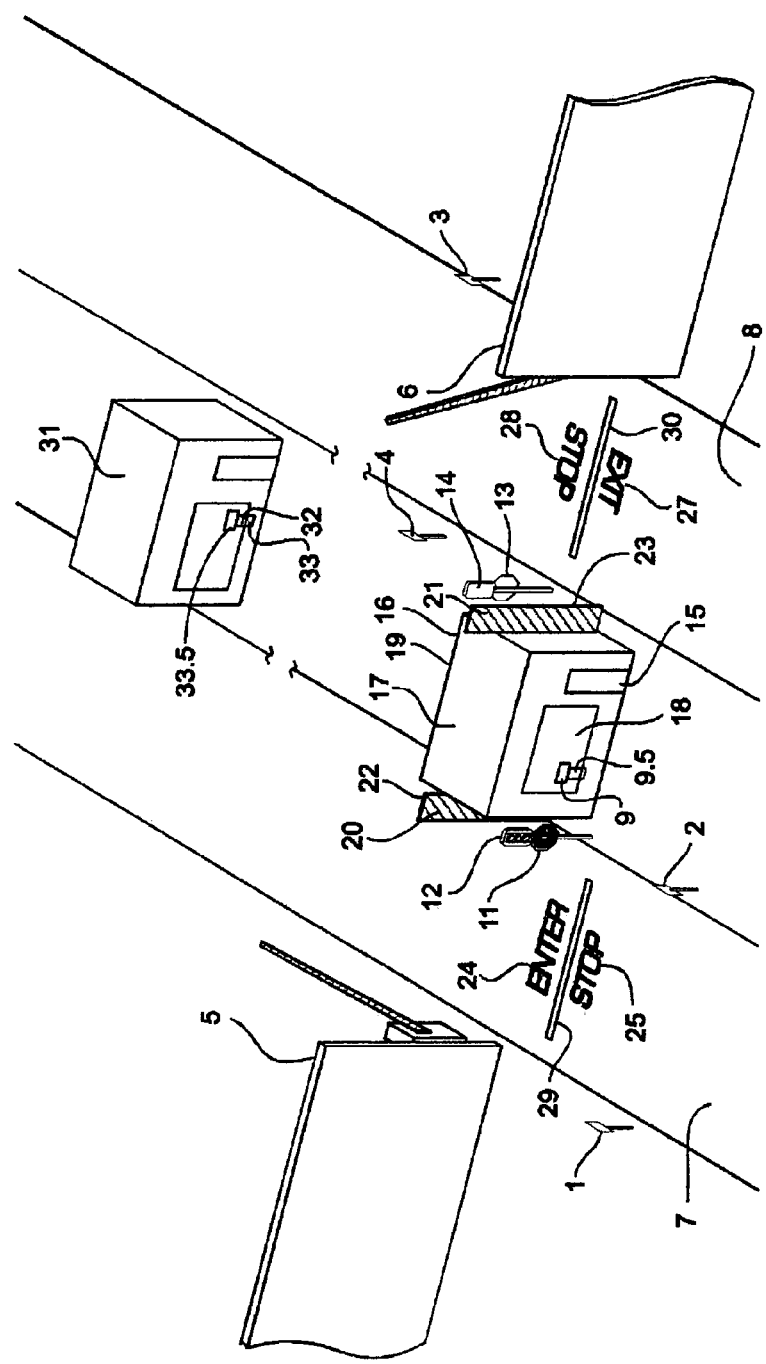

FIG. 6 is an external frontal view outside the property of the driveway entrance and exit of the property with the scanner on both sides of the driveway located on vertical bollard posts while the barricades are open.

Figure 6A:
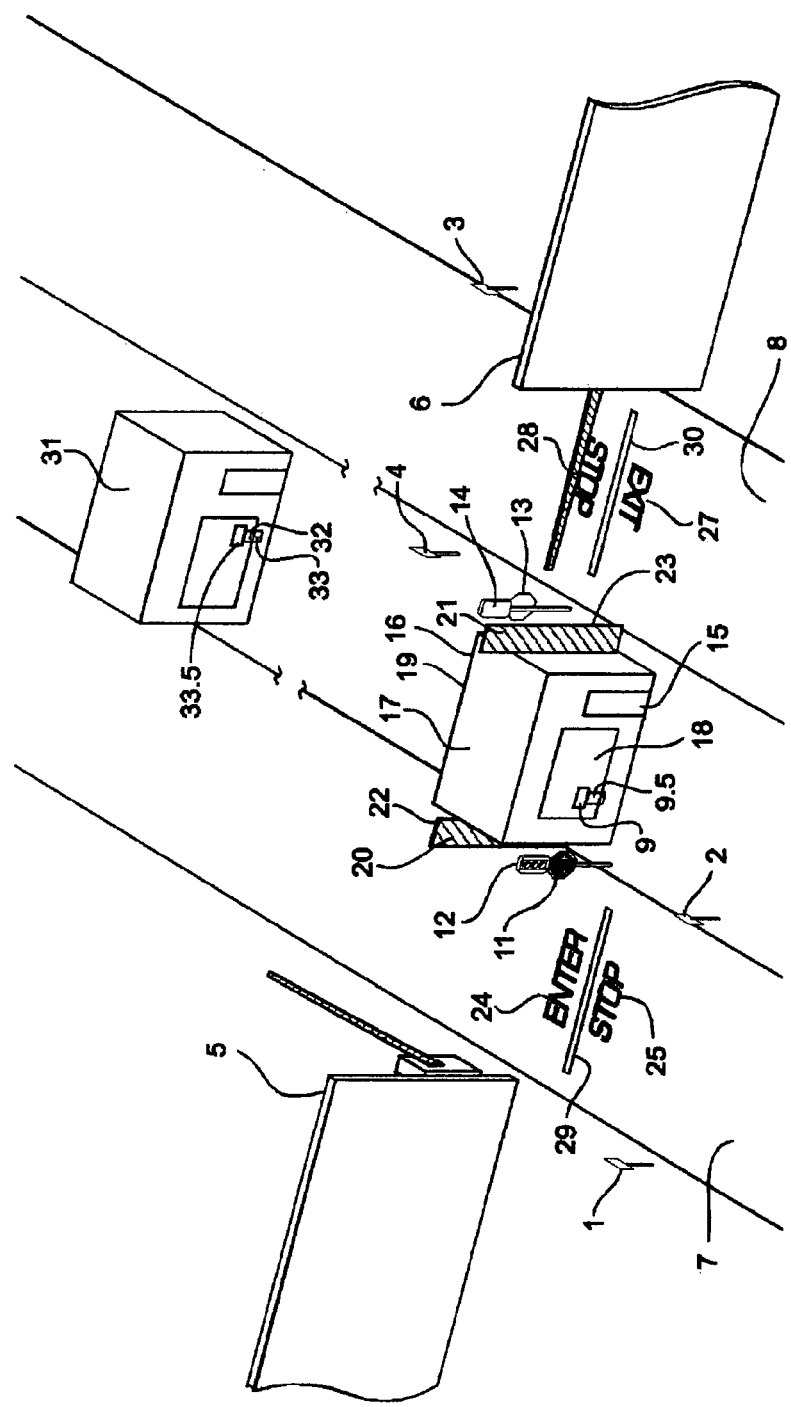
Figure 6B:
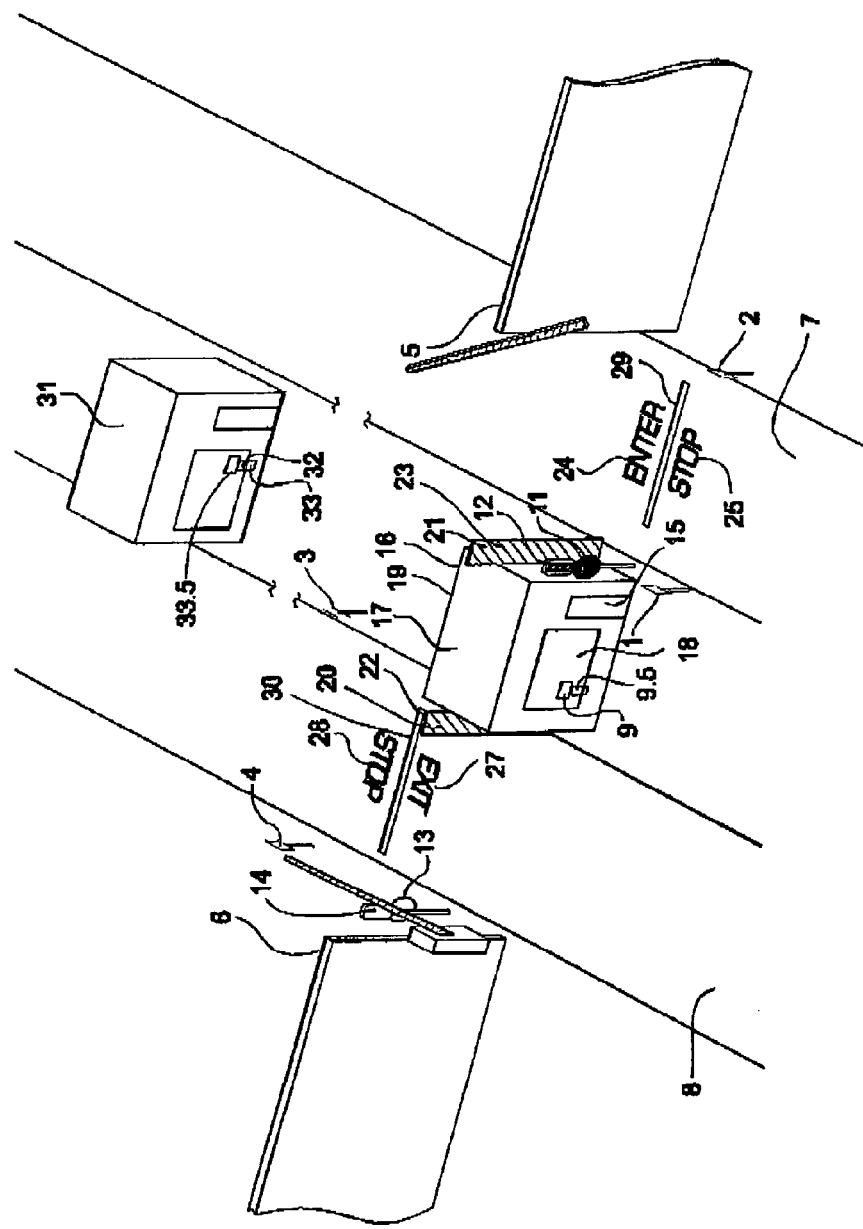
Figure 6A:
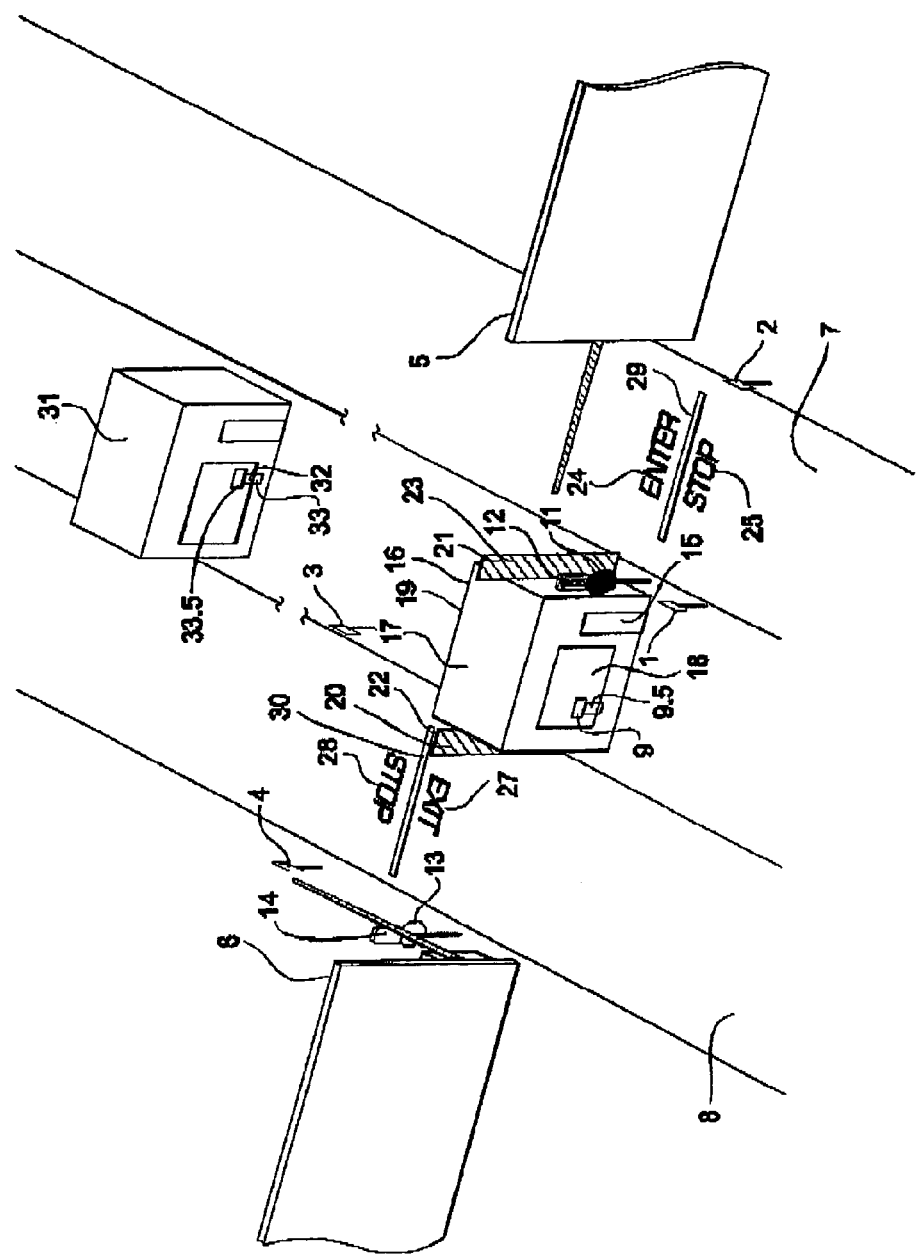

FIG. 6*a* is an external frontal view outside the property of the driveway entrance and exit of the property with the scanner on both sides of the driveway located on vertical bollard posts while one barricade is open and one barricade is closed.

Figure 7:
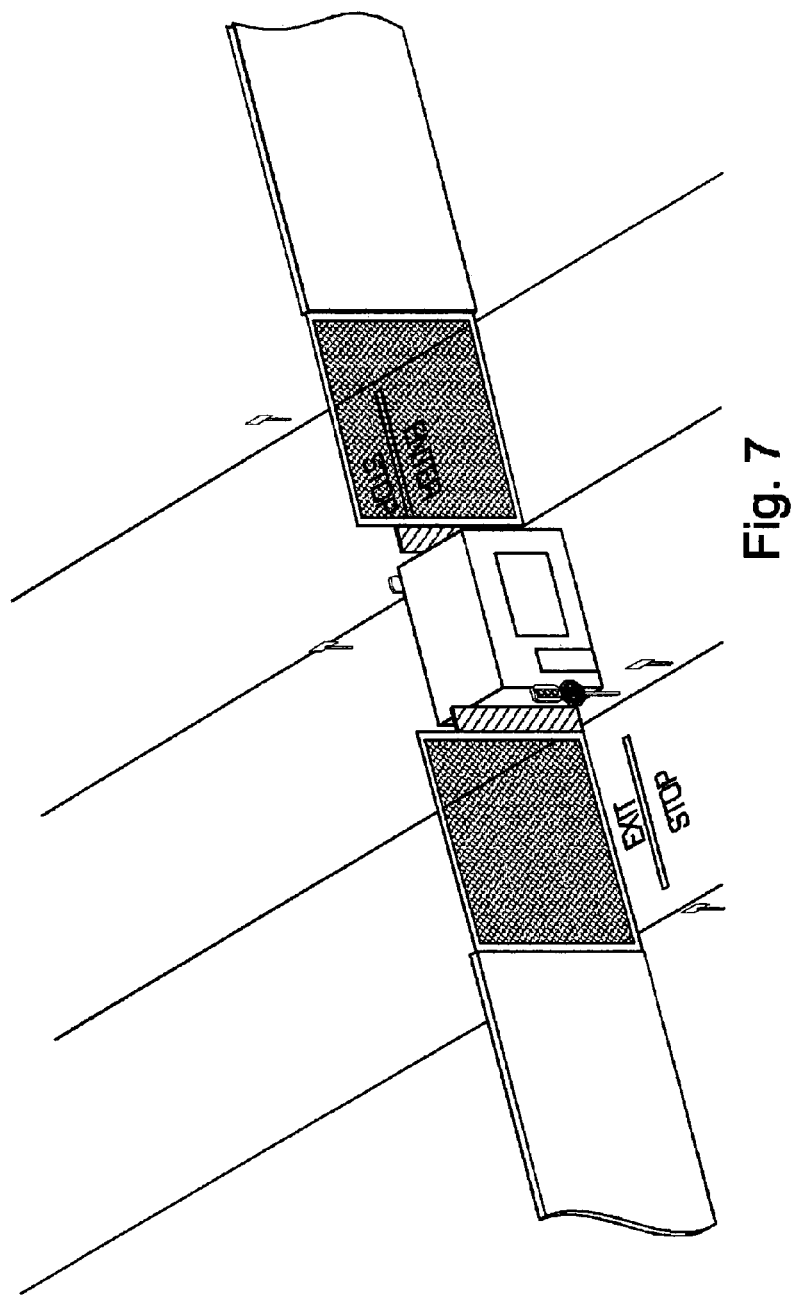

FIG. 7 is an internal frontal view inside the property of the driveway exit and entrance of the property with the scanner on both sides of the driveway located on vertical bollard posts while the gates are closed.

FIG. 8 is an internal frontal view inside the property of the driveway exit and entrance of the property with the scanner on both sides of the driveway located on vertical bollard posts while the gates are open.

Figure 8A:
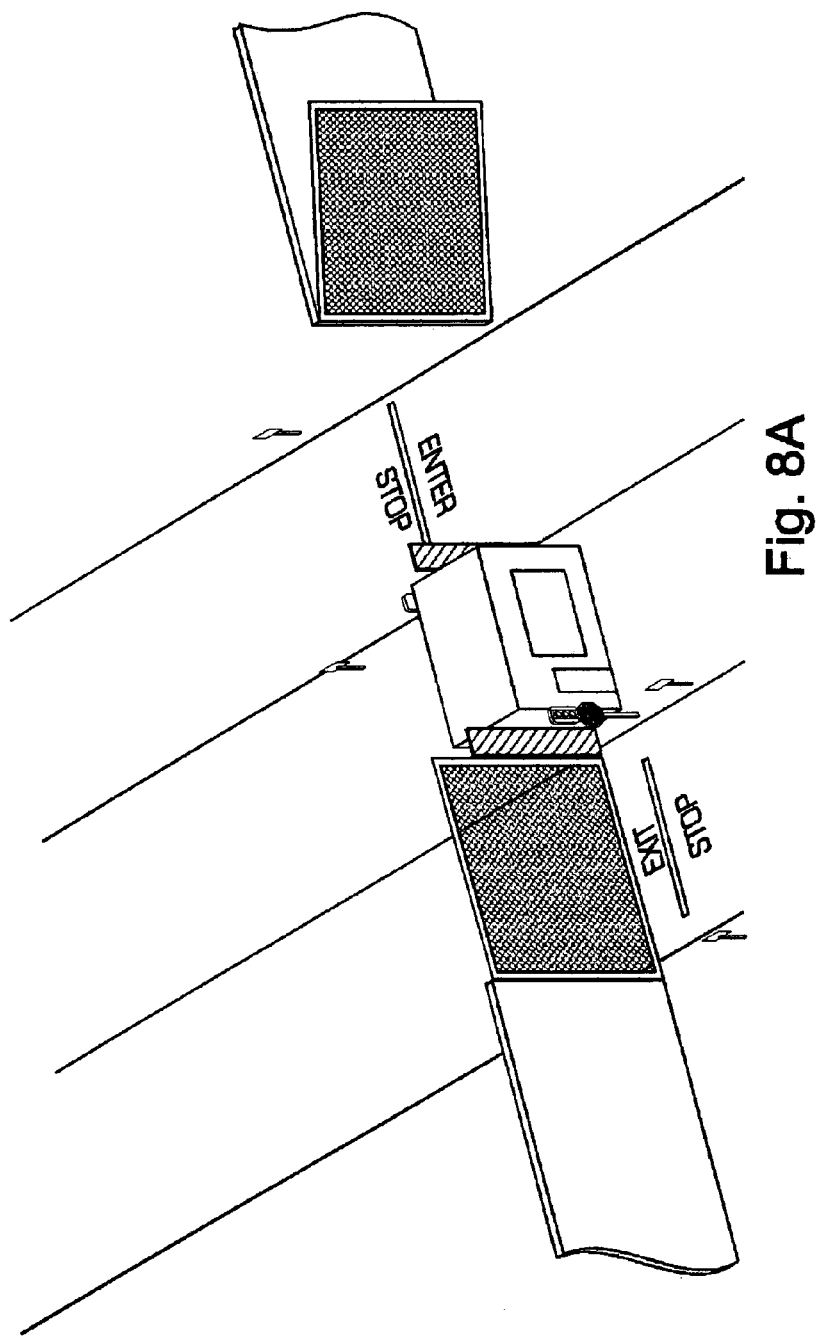

FIG. 8a is an internal frontal view inside the property of the driveway exit and entrance of the property with the scanner on both sides of the driveway located on vertical bollard posts while one gate is open and one gate is closed.

Figure 9:
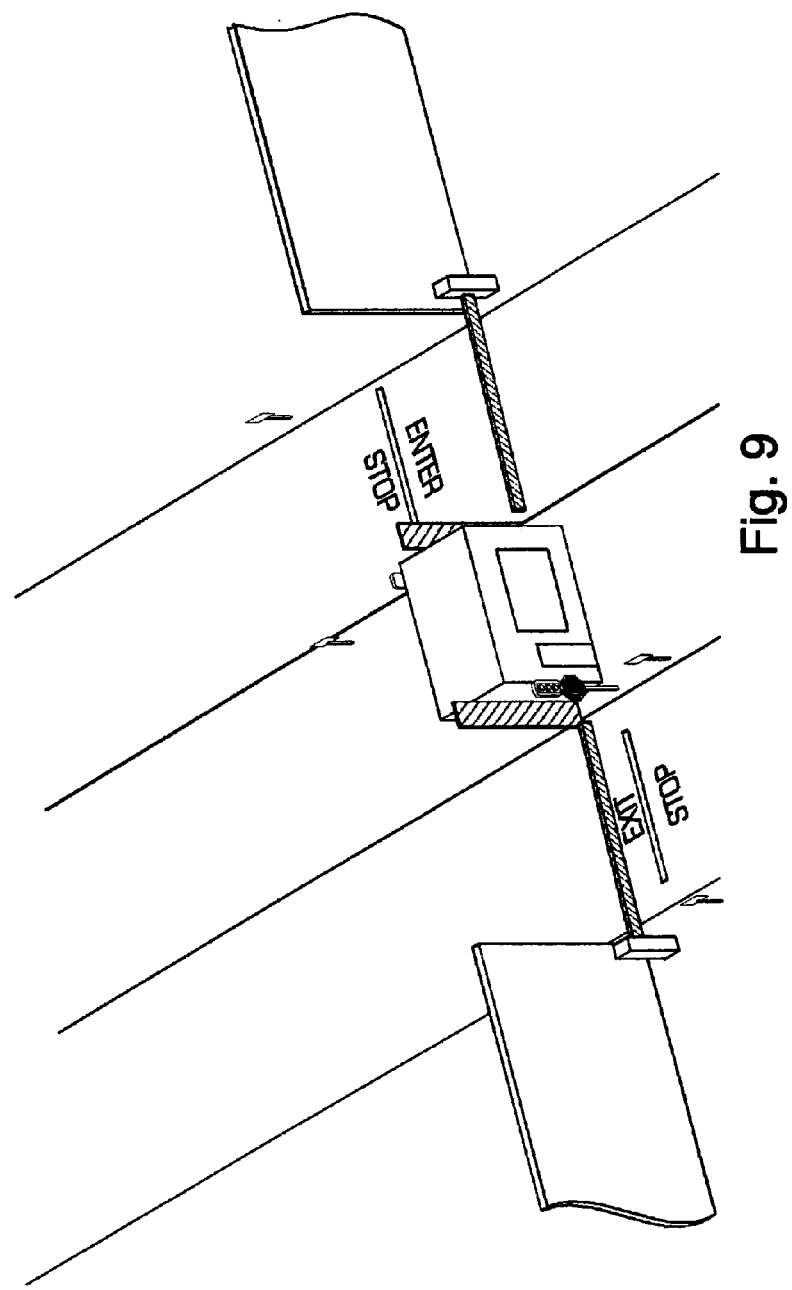

FIG. 9 is an internal frontal view inside the property of the driveway exit and entrance of the property with the scanner on both sides of the driveway located on vertical bollard posts while the barricades are closed.

FIG. 10 is an internal frontal view inside the property of the driveway exit and entrance of the property with the scanner on both sides of the driveway located on vertical bollard posts while the barricades are open.

Figure 10A:
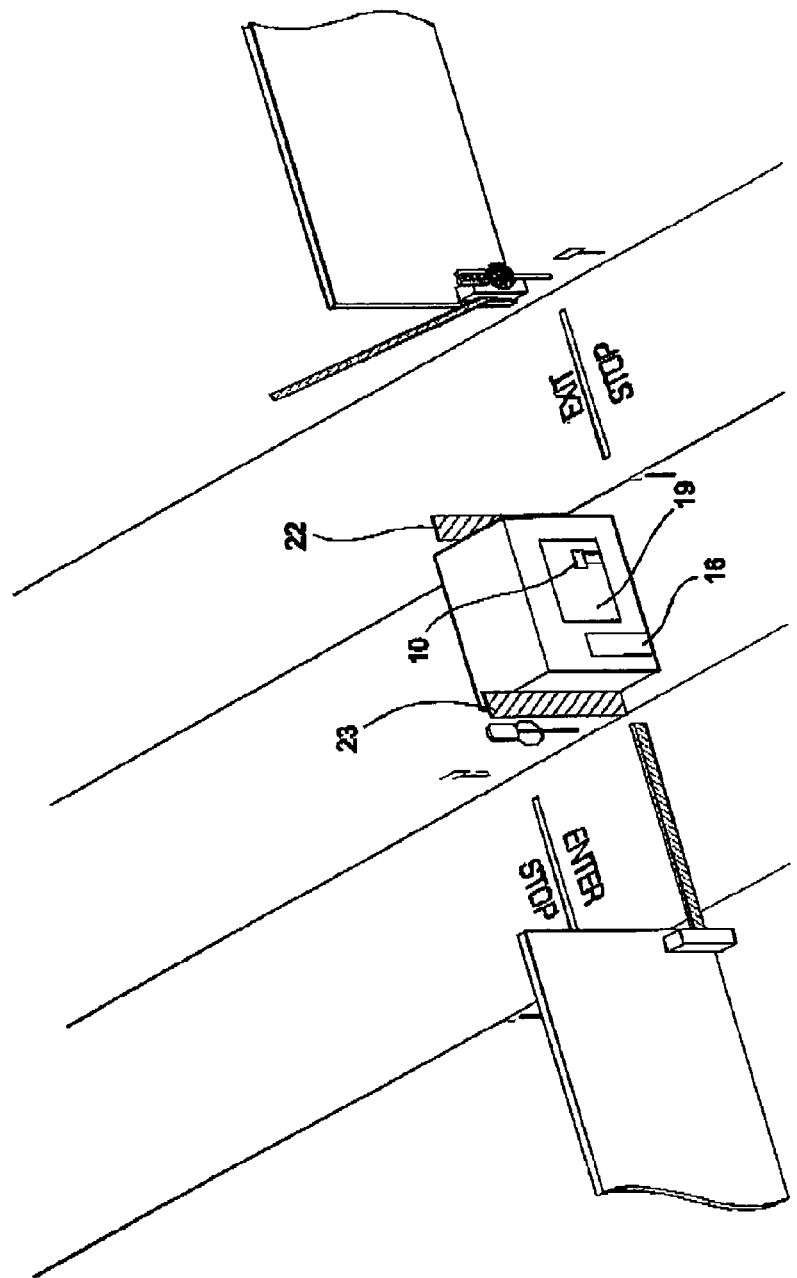

FIG. 10a is an internal frontal view inside the property of the driveway exit and entrance of the property with the scanner on both sides of the driveway located on vertical bollard posts while one barricade is open and one barricade is closed.

Figure 11A:
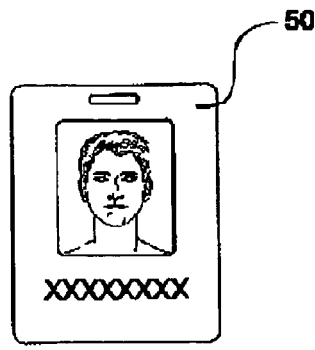
Figure 11B:
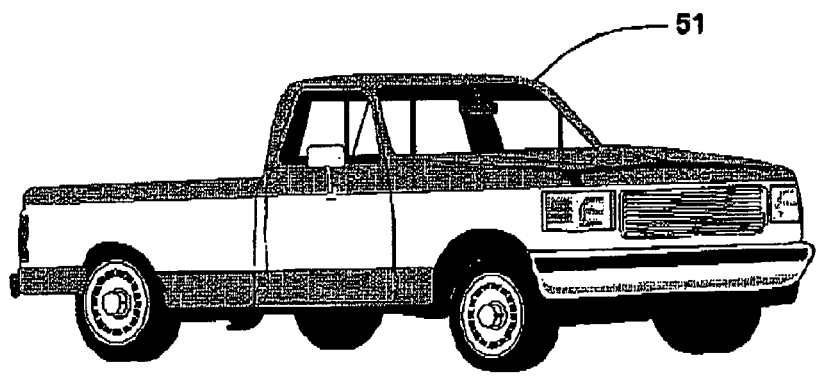
Figure 11C:
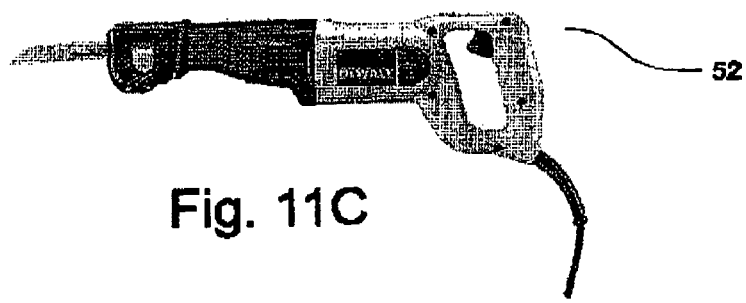

FIGS. 11A, 11B, and 11C are frontal views of objects that are identified with one or more of RFID, SAW, barcode or GPS tags or transponders.

FIGS. 1B-12B illustrate an embodiment similar to that shown in FIGS. 1-10A, except the entrance and exit areas are reversed.

Figure 12B:
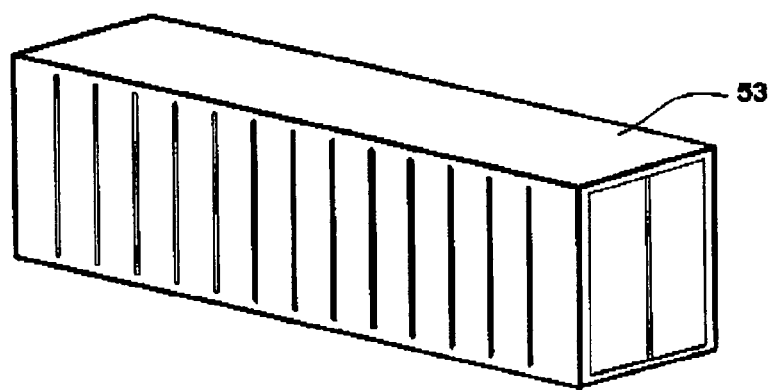

FIG. 12B is a perspective view of an example of a storage container that may be used with embodiments of the present invention.

DESCRIPTION OF PREFERRED EMBODIMENTS

FIGS. 1 through 8 illustrate the property gate or barricade closed and open. The standard gate or barricade for property entrances and exits are generally electric or manually operated. Traditionally, gates and barricades for entrances and exits are designed to physically allow a vehicle to enter the property or keep out a vehicle from entering the property.

An advantage of the present invention is to operate the gate or barricade as standard procedure electric or manual while operating a sensing devise such as a limit switch, photo eye, motion detector, magnetic switch, or laser when the gate or barricade is opened or closed. By opening or closing the gate or barricade will automatically update the database of location and time of gate or barricade operation. Operation of the gate or barricade open or closed energizes or de-energizes the scanners to read (RFID) Radio Frequency Identification, (SAW) surface acoustic wave technology, Barcode or (GPS) Global Positioning System. When the personnel data is updated in the database the (GPS) Global Positioning System is also energized to monitor the personnel throughout the property.

The reverse happens when exiting the property. By opening or closing the gate or barricade will automatically update the database of location and time of gate or barricade operation. Operation of the gate or barricade open or closed energizes or de-energizes the scanners to read (RFID) Radio Frequency Identification, (SAW) surface acoustic wave technology, Barcode or (GPS) Global Positioning System. When the personnel data is updated in the database the (GPS) Global Positioning System is also de-energized from monitoring the personnel.

FIGS. 9 and 10 illustrate the property with no gate or barricade. The standard entrance without a gate or barricade are generally open to anyone without documentation or a manually signed document including time entrance or exit is produced by the person entering or exiting the property.

An advantage of the present invention is to scan one or more of personnel with RFID receiver device, equipment, tools and vehicles as the pass through a specified zone. Personnel RFID receiver devices can be but not limited to RFID-ID card or badges. By energizing the sensing devise the scanner is opera table to scan any ID Identification Card held by the personnel entering or exiting the property, therefore automatically updating the database of personnel location, date and time passage of entering or exiting the property. Operation of the sensing devise energizes or de-energizes the scanners to read (RFID) Radio Frequency Identification, (SAW) surface acoustic wave technology, Barcode or (GPS) Global Positioning System. When the one or more personnel, equipment, tools or vehicle data is updated in the database the (GPS) Global Positioning System is also energized to monitor the personnel throughout the property.

The reverse happens when exiting the property. By energizing a sensing devise when one or more of personnel, equipment, tools or vehicles passes a specified scanning zone the sensing devise will then energize the scanner to make opera table to scan any ID Identification Card held by the personnel exiting the property, therefore automatically updating the database of personnel location and time passage. Operation of sensing devise energizes or de-energizes the scanners to read (RFID) Radio Frequency Identification, (SAW) surface acoustic wave technology, Barcode or (GPS) Global Positioning System. When the one or more personnel, equipment, tools or vehicle data is updated in the database the (GPS) Global Positioning System is also de-energized from monitoring the personnel.

Left side entry scanner 1 and 2 right side entry scanner, left side exit scanner 3 and 4 right side exit scanner are mounted to vertical structures, 5 vertical left fence at the entrance of the property, 6 vertical right fence at the exit of the property, 7 the entrance driveway of the property, 8 the exit driveway of the property. The entrance reading monitor 9 to be viewed by the entrance guard. The exiting reading monitor 10 to be viewed by the exit guard. 11 stop sign for entering personnel and vehicles 12 traffic signal light for entering personnel and vehicles. 13 stop sign for exiting personnel and vehicles. 14 traffic signal light for exiting personnel. 15 guard shack door entry and exit on entering vehicle side, 16 door for guard shack entry and exit on exit vehicle side.

Guard shack building 17 has a guard shack window 18 to allow for viewing of entering vehicles. Guard shack building 17 has a guard shack window 19 to allow for viewing of exiting vehicles. 20 and 21 vertical safety wall sign for entering. 22 and 23 vertical safety wall sign for exiting the property. 24 enter sign on entrance driveway, 25 stop sign on entrance driveway, 27 exit sign on exit driveway and 28 stop sign on exit driveway. 29 safety line on entrance driveway, 30 safety line on exit driveway. 31 management personnel building housing computer server 32 supporting database software 33 for one or more of RFID, SAW, barcode or GPS can be viewed by a viewing means 33.5. Connection between computer server 32 and computer terminal 9.5 can be connected via hard wire or wireless connection, cable or phone lines. Personnel badges 50, vehicles 51, tools 52, shipping and storage containers 53 are equipped with one or more of RFID, SAW, barcode, or GPS reader or transponders.

Vehicles 51 are equipped with one or more of RFID, SAW, barcode or GPS reader or transponders. Equipment and tools 52 are equipped with one or more of RFID, SAW, barcode or GPS reader or transponders.

The invention claimed is:

1. A property entrance, notification, tracking, and inventory control system comprising:
   a zone to be monitored;
   an identification device related to an object, wherein the identification device is capable of communicating a signal within the zone to be monitored, wherein the signal is communicated by at least one of either a radio-frequency-identification ("RFID") device, a surface acoustical wave ("SAW") device, an electromagnetic wave device, a barcode device, or a global positioning system ("GPS") device, and wherein the GPS device is capable of communicating a GPS signal that communicates data to a computer system to allow for the tracking of changes in location and movement of the identification device while within the zone to be monitored, and wherein the computer system is capable of generating inventory control information using at least one of either the signal or the GPS signal;
   wherein the identification device is activated to communicate the signal and the GPS signal upon entrance into the zone to be monitored;
   means for updating a computer database network;
   wherein the inventory control information includes at least one of either a history of the movements of the object while in the zone to be monitored, the date the object moved from one location to another, the time the object moved from one location to another, the speed the object moved from one location to another, the rate of acceleration of the object as the object moved from one location to another, the rate of deceleration of the object as the object moved from one location to another, the amount of time the object remained at a single location, the date and time the object entered the zone to be monitored, the date and time the object exited the zone to be monitored, any apparent association between the object and a second identification device, and any predetermined correlation between the object and a second identification device;
   the capability of sensing an opening or a closing of at least one of either a gate or barricade; and
   the capability of sensing at least one of either a movement or a position of the gate or barricade; and
   wherein the inventory control information includes information about a movement of a vehicle, a piece of equipment, a tool, a container, or a person, whereby as the gate or barricade is either opened or closed the inventory control information is automatically updated.

2. The property entrance, notification, tracking, and inventory control system of claim 1 wherein the object is at least one of either a vehicle, a tool, a piece of equipment, a container, or a person.

* * * * *